(12) United States Patent
Lark, Jr. et al.

(10) Patent No.: US 11,483,914 B2
(45) Date of Patent: Oct. 25, 2022

(54) INTELLIGENT LIGHTING CONTROL RADAR SENSING SYSTEM APPARATUSES AND METHODS

(71) Applicant: Savant Systems, Inc., Hyannis, MA (US)

(72) Inventors: William Lark, Jr., Glendale, CA (US); Nicholas David Pennycooke, San Mateo, CA (US)

(73) Assignee: Savant Systems, Inc., Hyannis, MA (US)

( * ) Notice: Subject to any disclaimer, the term of this patent is extended or adjusted under 35 U.S.C. 154(b) by 155 days.

(21) Appl. No.: 16/865,101

(22) Filed: May 1, 2020

(65) Prior Publication Data

US 2020/0352003 A1 Nov. 5, 2020

Related U.S. Application Data

(60) Provisional application No. 62/880,404, filed on Jul. 30, 2019, provisional application No. 62/841,407, filed on May 1, 2019.

(51) Int. Cl.
*H05B 47/12* (2020.01)
*H05B 47/155* (2020.01)
*G01S 13/86* (2006.01)

(52) U.S. Cl.
CPC .............. *H05B 47/12* (2020.01); *G01S 13/86* (2013.01); *H05B 47/155* (2020.01)

(58) Field of Classification Search
CPC .... H05B 47/12; H05B 47/155; H05B 47/115; G01S 13/86; Y02B 20/40
See application file for complete search history.

(56) References Cited

U.S. PATENT DOCUMENTS

| 10,037,673 B1 * | 7/2018 | Gray | G08B 21/22 |
| 2016/0126733 A1 * | 5/2016 | Hick | H05B 47/11 |
| | | | 700/295 |

(Continued)

FOREIGN PATENT DOCUMENTS

EP 3731251 A1 * 10/2020 ............. H01H 9/167

OTHER PUBLICATIONS

PCT Notification of Transmittal of the International Search Report and the Written Opinion of the International Searching Authority, or the Declaration, International Searching Authority, International Applic2ation No. PCT/US2020/031033, dated Dec. 14, 2020, 17 pages.

(Continued)

*Primary Examiner* — Raymond R Chai
(74) *Attorney, Agent, or Firm* — Cesari and McKenna, LLP

(57) ABSTRACT

A lighting control system can be implemented to analyze information such as occupancy of a room, to track movements of one or more subjects in a room and to determine how many subjects are in a room. The lighting control system includes a lighting control module configured to cause a transmission of a quantity of electrical energy to a lighting circuit of a luminaire electrically connected to the lighting control module. The lighting control system include a sensor system positioned in the lighting control module. The sensor system includes a primary sensor and at least one auxiliary sensor. The sensor system includes a plurality of sensor types.

20 Claims, 17 Drawing Sheets

(56) References Cited

U.S. PATENT DOCUMENTS

| | | | |
|---|---|---|---|
| 2016/0227628 A1 | 8/2016 | Lydecker et al. | |
| 2018/0014392 A1 | 1/2018 | Charlton et al. | |
| 2019/0008019 A1* | 1/2019 | Le Hénaff | G01S 5/02 |
| 2019/0186767 A1* | 6/2019 | Patel | G05B 15/00 |
| 2019/0313511 A1* | 10/2019 | Trice | H05B 47/115 |
| 2020/0352003 A1* | 11/2020 | Lark, Jr. | H05B 47/155 |
| 2020/0370934 A1* | 11/2020 | Jonsson | G01D 21/02 |
| 2021/0383556 A1* | 12/2021 | Steiner | H05B 47/105 |

OTHER PUBLICATIONS

Invitation to Pay Additional Fees and, Where Applicable, Protest Fee, International Application No. PCT/US2020/031033, dated Aug. 19, 2020, 15 pages.

\* cited by examiner

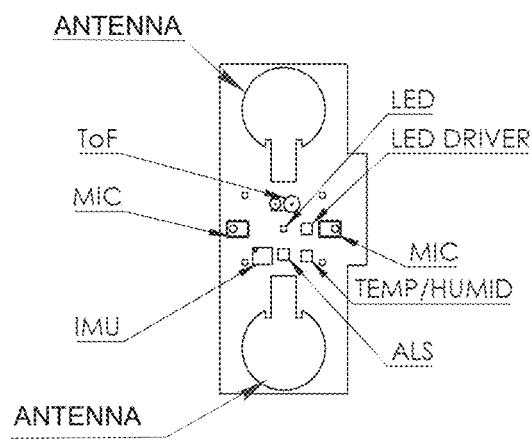
FIG. 9A
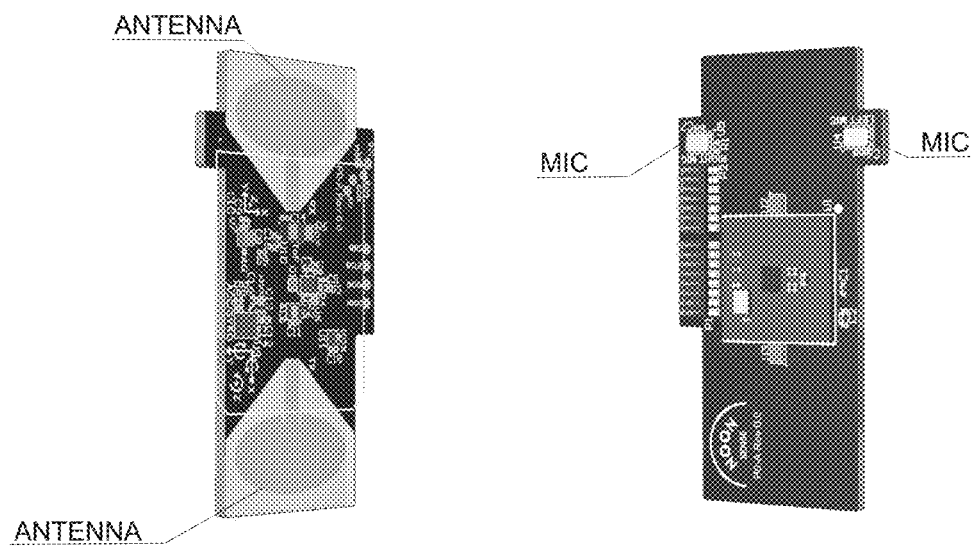
FIG. 9B  FIG. 9C

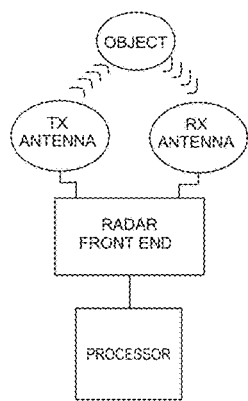
FIG 10A
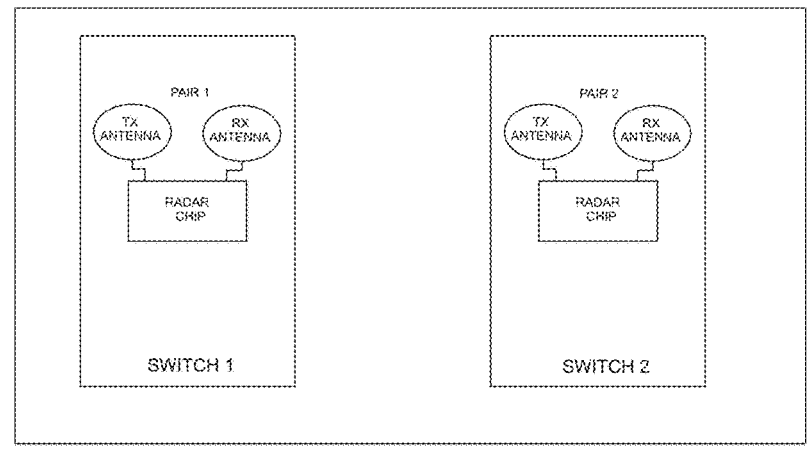
FIG 10B
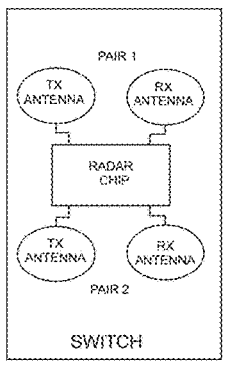
FIG 10C
FIG 10D
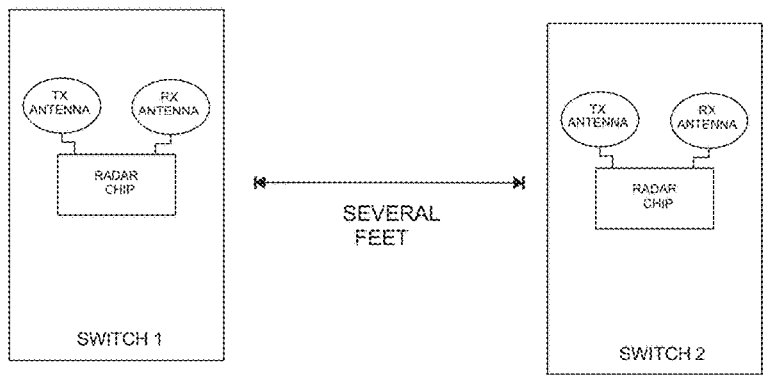

INTELLIGENT LIGHTING CONTROL RADAR SENSING SYSTEM APPARATUSES AND METHODS

CROSS-REFERENCE TO RELATED APPLICATIONS

The present application claims the benefit of U.S. Provisional Patent Application Ser. No. 62/841,407, which was filed on May 1, 2019 by William Lark, Jr. et al., for INTELLIGENT LIGHTING CONTROL RADAR SENSING SYSTEM APPARATUSES AND METHODS, and U.S. Provisional Patent Application Ser. No. 62/880,404 which was filed on Jul. 30, 2019 by Nicholas David Pennycooke et al, for INTELLIGENT LIGHTING CONTROL SENSING SYSTEM APPARATUSES AND METHODS, which applications are hereby incorporated by reference.

TECHNICAL FIELD

The present application relates generally to the field of lighting control systems.

BACKGROUND

Customizing and automating home lighting control devices is often epitomized by the installation of unsightly lighting switches that are inundated with light switches confusingly mapped to respective fixtures. Automated home lighting control systems can also include large, complex, expensive central hubs that require expert or skilled technicians for installation and/or operation. Smart light bulbs and/or Wi-Fi enabled lightbulbs introduced into any of these contexts or even in simpler ones can disadvantageously be limited by the light switch that it is associated with ad/or the lighting fixture itself. For example, if a light switch associated with a smart light bulb is switched off the smart light bulb becomes inoperable. As the components and connections of lighting control devices expands implementing changes to the system and controlling operation of the system can also change.

SUMMARY

The inventors have appreciated that various embodiments disclosed herein provide apparatuses, systems, and methods for detecting activities and conditions to intelligently control lighting control systems.

Various embodiments provide lighting control systems that can be implemented to analyze information such as occupancy of a room, to track movements of one or more subjects (e.g., human beings) in a room and to determine how many subjects are in a room. The lighting control system may include a lighting control module configured to cause a transmission of a quantity of electrical energy to a lighting circuit of a luminaire electrically connected to the lighting control module. The lighting control system may include a sensor system positioned in the lighting control module. The sensor system may include a primary sensor and at least one auxiliary sensor. The sensor system may include a plurality of sensor types which includes "active" sensors (i.e., sensors that transmit some type of energy and detect a change in the received energy created by the presence or motion of a subject) and "passive" sensors (i.e., sensors that detect some type of energy or matter that is emitted by the subject or detect a change of some natural emission or emitted field of energy caused by the subject). Notably, the primary and auxiliary sensors are of different types based on distinct classes of excitation (e.g., mechanical, electromagnetic and electro/opto-chemical) that may be used cooperatively without cross-interference.

The lighting control system may include a controller system communicably coupled to the sensor system and configured to control the transmission of the quantity of electrical energy to the lighting circuit. The primary sensor in the sensor system may be configured to monitor continuously. The controller system may be configured to analyze one or more primary sensor signals from the primary sensor. The controller system may be configured to selectively analyze one or more auxiliary sensor signals obtained from the auxiliary sensor in response to the primary sensor signals from the primary sensor being below a predetermined threshold (i.e., failing to detect presence of the subject). In this manner, signals from a multitude of different sensor types and sensitivities may be fused to more accurately detect presence of a subject. The controller system may be further configured to modify the transmission of the quantity of electrical energy to the lighting circuit in response to the analysis of one or more of the one or more primary sensor signals and the one or more auxiliary sensor signals.

In one or more embodiments, the controller system may be configured to select a lighting scene from a plurality of lighting scenes based on analyzing sensor signals from the primary sensor and the auxiliary sensor. The controller system may be configured to modify a lighting setting of a light switch module based on analyzing the sensor signals from the primary sensor and the auxiliary sensor.

In one or more embodiments, the predetermined threshold may depend on a distance of a detected object (e.g., human subject) being determined to be above a distance threshold based on the primary sensor signal. The predetermined threshold may depend on a variability in a plurality of primary sensor signals of the primary sensor being above a predetermined variability range.

In one or more embodiments, the auxiliary sensor may be configured to remain inactive until selectively activated by the controller system. The auxiliary sensor may be configured for activation in response to a detection by the primary sensor.

In one or more embodiments, the lighting control system may include a light switch module coupled to a radar system. The lighting control module may include a light switch actuator.

It should be appreciated that combinations of the foregoing concepts and additional concepts discussed in greater detail below (provided such concepts are not mutually inconsistent) are contemplated as being part of the inventive subject matter disclosed herein. In particular, the combinations of claimed subject matter appearing at the end of this disclosure arc contemplated as being part of the inventive subject matter disclosed herein. It should also be appreciated that terminology explicitly employed herein that also may appear in any disclosure incorporated by reference should be accorded a meaning most consistent with the embodiments disclosed herein.

BRIEF DESCRIPTION OF THE DRAWINGS

The drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 9A-9C illustrate various embodiments of a sensor system.

FIG. 10A-10D illustrate various embodiments of a radar system.

The features and advantages of the inventive subject matter disclosed herein will become more apparent from the detailed, description set forth below when taken in conjunction with the drawings.

DETAILED DESCRIPTION

Following below are more detailed descriptions of various concepts related to, and exemplary embodiments of, inventive systems, methods and components of lighting control devices.

Figure 1A:
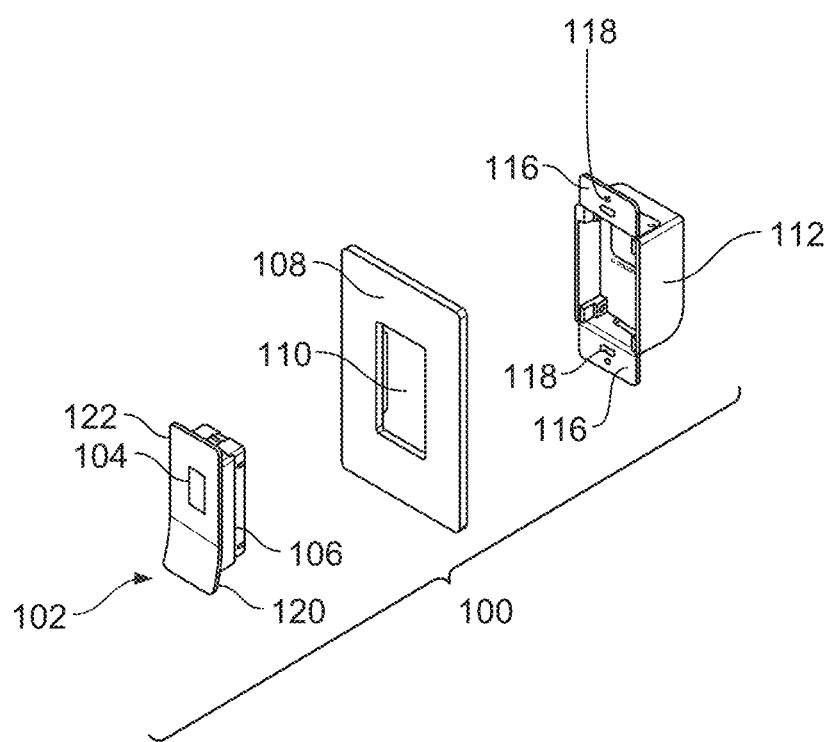
FIG. 1A is a perspective partially exploded view of a lighting control device.

FIG. 1A is a perspective partially exploded view of a lighting control device 100. The lighting control device 100 includes a switch module 102 including a light switch actuator 106 and a tactile display 104 housed in the light switch actuator 106. The lighting control device 100 also includes a wall plate cover 108 including a switch module opening 110 extending there through. The lighting control device 100 also includes a base module 112 configured for coupling to the switch module 102 via multi-pin socket 114. The base module 112 is sized and configured for receipt within a one-gang wall electrical box and has a volume corresponding substantially thereto. The base module 112 is configured to be coupled to a wall electrical box via connection tabs 116 and fastener apertures 118 in the connection tabs 116.

The light switch actuator 106 includes an outer actuation surface 122, which as discussed further herein may be composed of glass. The actuation surface 122 is movable, for example, by pushing on the curved foot 120 to cause the light switch actuator 106 to pivot, for example. The pivoting of the light switch actuator 106 and the actuation surface 122 causes a contact component (shown in FIG. 2) of the switch actuator 106 to move from a first position to a second position. Movement of the contact component causes a connection of an electrical flow path, for example by allowing two electrical contacts to connect or by connecting the contact component with an electrical contact. The connecting of the electrical flow path permits electrical energy supplied by a power source connected to the base module 112 to energize or activate the tactile display 104, as discussed in further detail herein. The tactile display 104 is structured in the switch module to move contemporaneously with at least a portion of the actuation surface 122 and with the actuator 106. When activated or energized, the tactile display 104 allows a user to define or select predefined lighting settings where the lighting settings change the voltage or power supplied to one or more light fixtures. The change in power supplied to the light fixtures may include a plurality of different voltages supplied to each fixture and may be based on various parameters including, but not limited to, location, light intensity, light color, type of bulb, type of light, ambient light levels, time of day, kind of activity, room temperature, noise level, energy costs, user proximity, user identity, or various other parameters which may be specified or detected. Furthermore, the lighting control device 100 may be connected to all of the lights in a room or even in a house and can be configured to operate cooperatively with one or more other lighting control devices 100 located in a unit or room and connected to the same or distinct lighting fixtures.

Figure 1B:
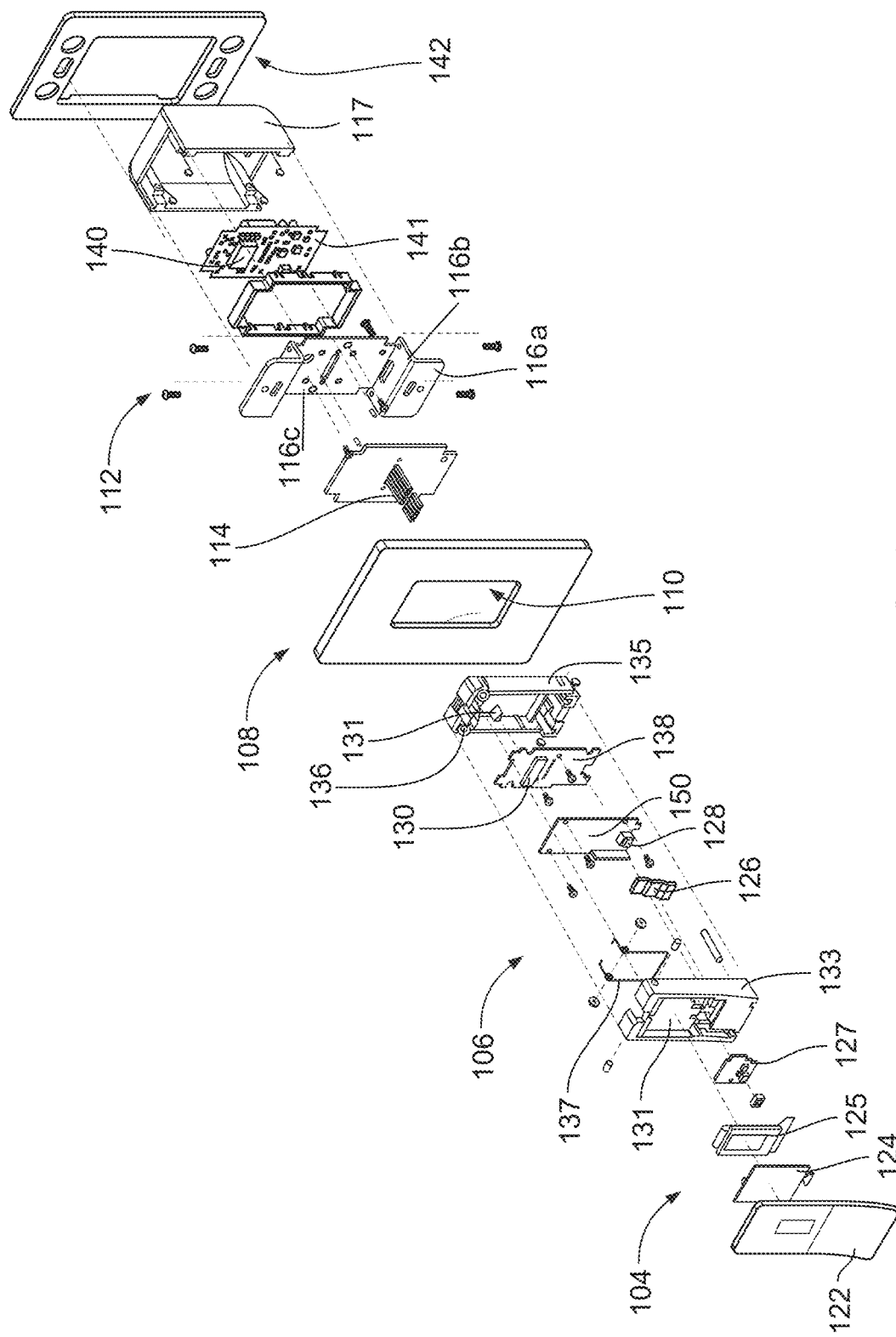
FIG. 1B is a fully exploded view of the lighting control device of FIG. 1A.

FIG. 1B is a fully exploded view of the lighting control device 100 of FIG. 1A. As demonstrated in FIG. 1B, the tactile display 104 is positioned between the outer actuation surface 122 and the light switch actuator 106. The actuation surface 122 may be composed of an impact-resistant glass material permitting light from the tactile display 104 and/or a clear sight of path for sensors 127 or other lights, such as a light from light pipe 126 indicating activation to pass through the actuation surface 122. The tactile display 104 is composed of a polymer-based capacitive touch layer 124 and a light emitting diode panel 125, which are controlled via one or more modules or processors positioned on the printed circuit board 129. The tactile display 104 is housed within a recess 131 of the light switch actuator 106 beneath the actuation surface 122. The light switch actuator 106 may be formed as a thermoplastic housing including a housing cover 133 and a housing base 135. The light switch actuator housing cover 133 is pivotally connected to the housing base 135 via pins 136 and the housing cover 133 is biased with respect the housing base 135 via torsion spring 137. In particular embodiments, the light switch actuator housing cover 133 may be configured to slide or otherwise translate or rotate. The outer actuation surface 122 is biased with the switch actuator housing cover 133 and moves contemporaneously therewith in concert with the tactile display 104 housed in the cover component 133 of the light switch actuator 106. The light switch actuator 106 includes a switch pin 128 movable between positions to close an open circuit on the primary printed circuit board substrate 150, which board also houses a switch controller or processor. In certain embodiments the light switch actuator 106 may include a circuit board stack, including the primary printed circuit board substrate 150 and a secondary printed circuit board 138. The light switch actuator 106 may include a latch 136 for coupling to the base module 112 (e.g. as the light switch actuator 106 is passed through the opening 110 in the wall plate cover 108), which latch causes the light switch actuator 106 to click into place. The housing base 135 includes a multi-pin connector or plug 134 configured to engage the multi-pin socket 114 of the base module 112.

The lighting control device 100 includes a mounting chassis 142 configured to be installed to an electrical wall box. The mounting chassis 142 creates an even surface for installation of the other modules (e.g., the base module 112 and the switch module 102). Once the base module is connected to the electrical wall box via the mounting chassis 142, the wall plate cover 108 can be coupled to the mounting chassis 142 and the light switch actuator 106 can be inserted through the switch module opening 110. In particular embodiments, the wall plate cover can be coupled to the mounting chassis 142 and/or the tabs 116 of the base module via magnets. The magnets may be recessed within openings of a portion of the wall plate cover 108. As noted, the base module 112 is configured to be coupled to the mounting chassis 142 via connection tabs 116. The base module 112 is further configured to be electrically coupled to a power source (e.g., an electrical wire coming from an electrical breaker box to the electrical wall box) and to one or more light fixtures wired to the electrical box. Accordingly, the base module 112 provides an interface between a power source, the light switch actuator 106, and one or more light fixtures. The base module includes a processor 140 and a circuit board 141 for managing the power supplied by the power source and routed to the one or more light fixtures in accordance with a light setting selection identified via the light switch actuator 106 or the tactile display 104.

One or more of the processor 130 on the printed circuit board 138 and the base module processor 140 may include wireless links for communication with one or more remote electronic devices such as a mobile phone, a tablet, a laptop, another mobile computing device, one or more other lighting control devices 100 or other electronic devices operating in a location. In one or more embodiments, the wireless links permit communication with one or more devices including, but not limited to smart light bulbs, thermostats, garage door openers, door locks, remote controls, televisions, security systems, security cameras, smoke detectors, video game consoles, robotic systems, or other communication enabled sensing and/or actuation devices or appliances. The wireless links may include BLUETOOTH classes, Wi-Fi, Bluetooth-low-energy, also known as BLE (BLE and BT classic are completely different protocols that just share the branding), 802.15.4, Worldwide Interoperability for Microwave Access (WiMAX), an infrared channel or satellite band. The wireless links may also include any cellular network standards used to communicate among mobile devices, including, but not limited to, standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

Figure 2A:
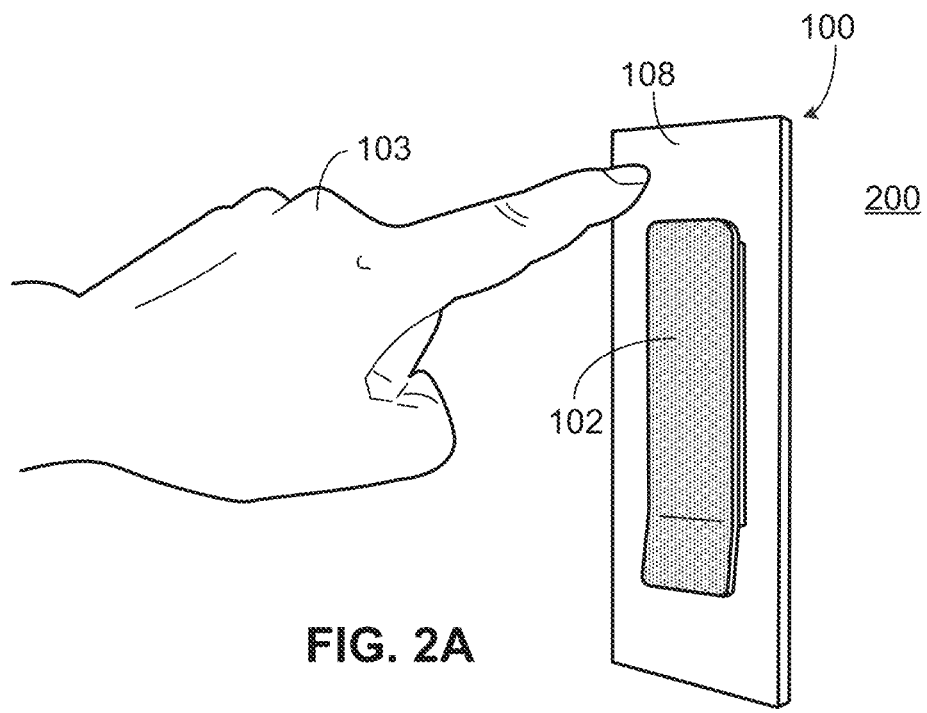
FIG. 2A shows the lighting control device of FIG. 1A mounted on a wall.

FIG. 2A shows the lighting control device 100 of FIG. 1A mounted on a wall 200. As demonstrated in FIG. 2A, the base module 112 is not visible upon installation of the lighting control device 100 in view of the wall plate cover 108. Because the wall plate cover 108 attaches to the base module 112, the wall plate cover 108 appears to be floating on the wall 200. The lighting control device 100 may be activated by a user 103 interacting with the outer actuation surface 122 and the tactile display 104.

Figure 2B:
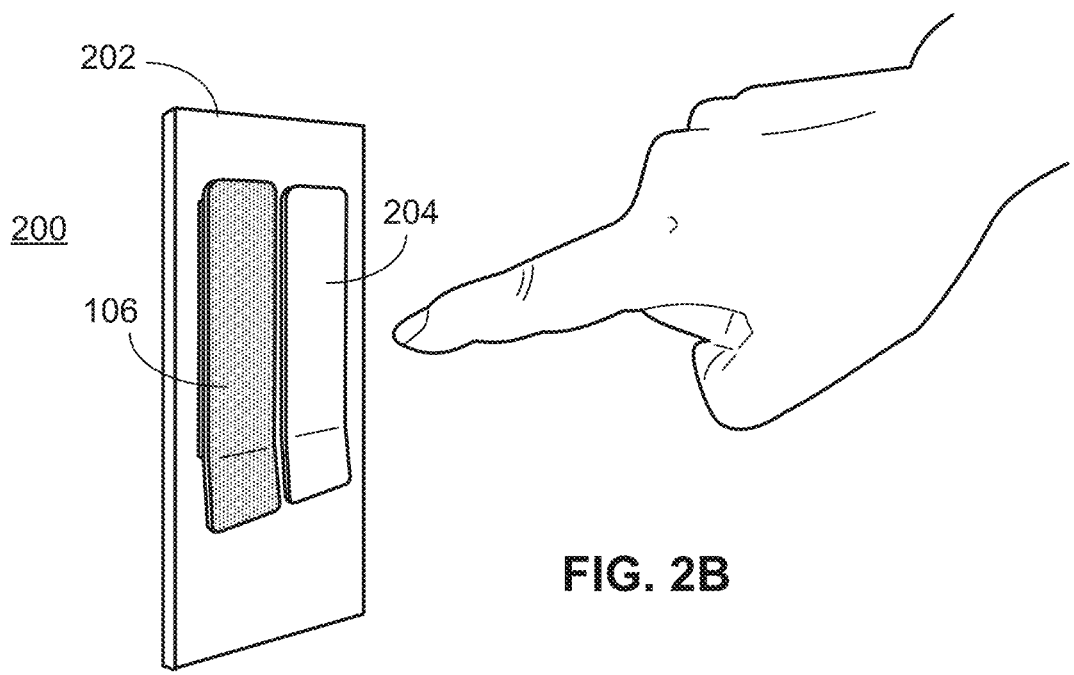
FIGS. 2B and 2C illustrate multi-switch lighting control devices.
Figure 2C:
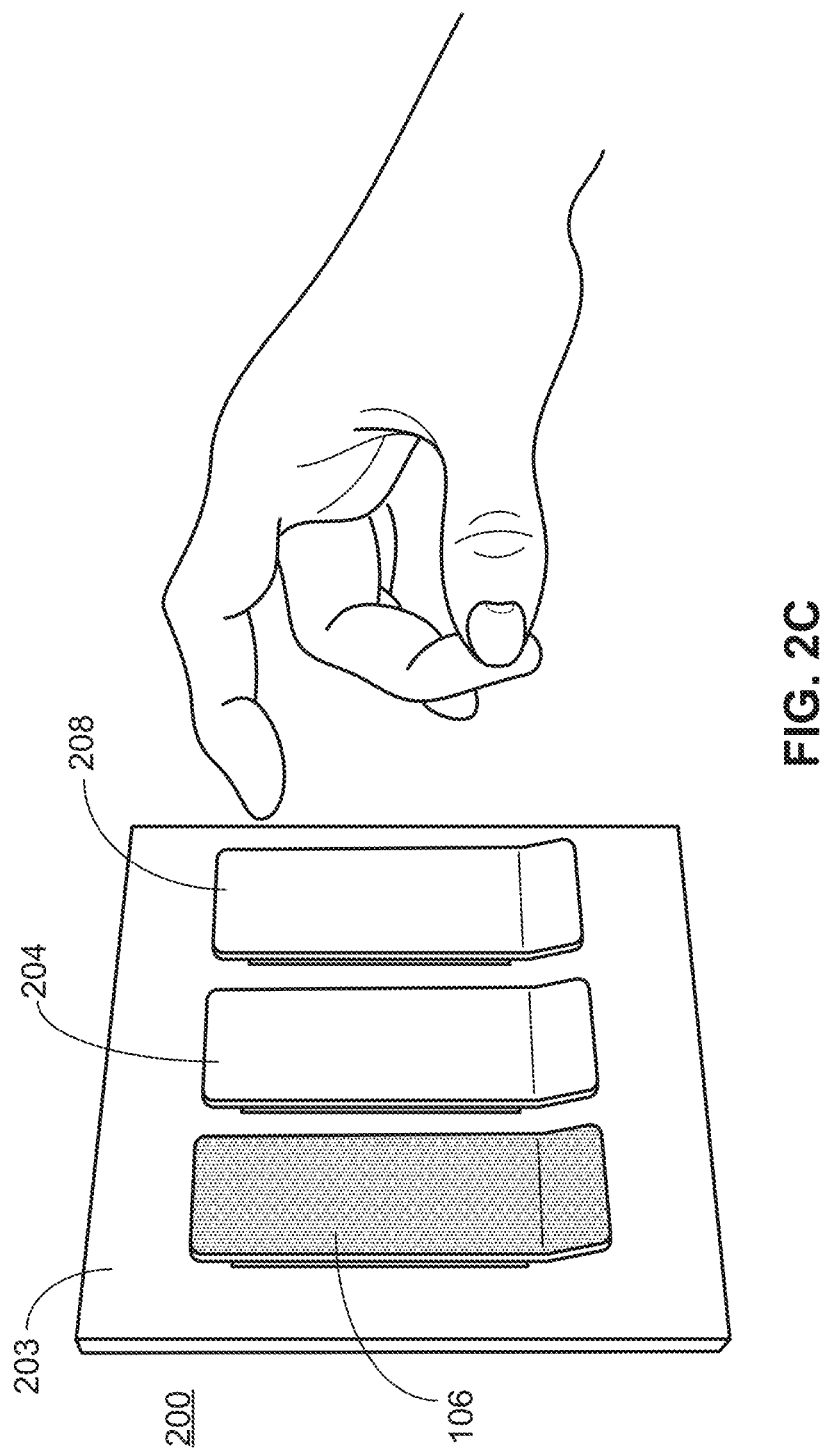

FIGS. 2B and 2C illustrate multi-switch configurations of multiple lighting control devices. FIGS. 2B and 2C illustrate two switch and three switch embodiments, respectively, where the lighting control devices 202 and 203 each include a light switch actuator 106 as well as auxiliary switches 204 and 208, as well as 2 and 3 base modules 112, respectively.

FIGS. 3A-3F illustrate a lighting control device transitioning through various lighting settings and a room having lighting fixtures controlled by the lighting control device.

Figure 3A:
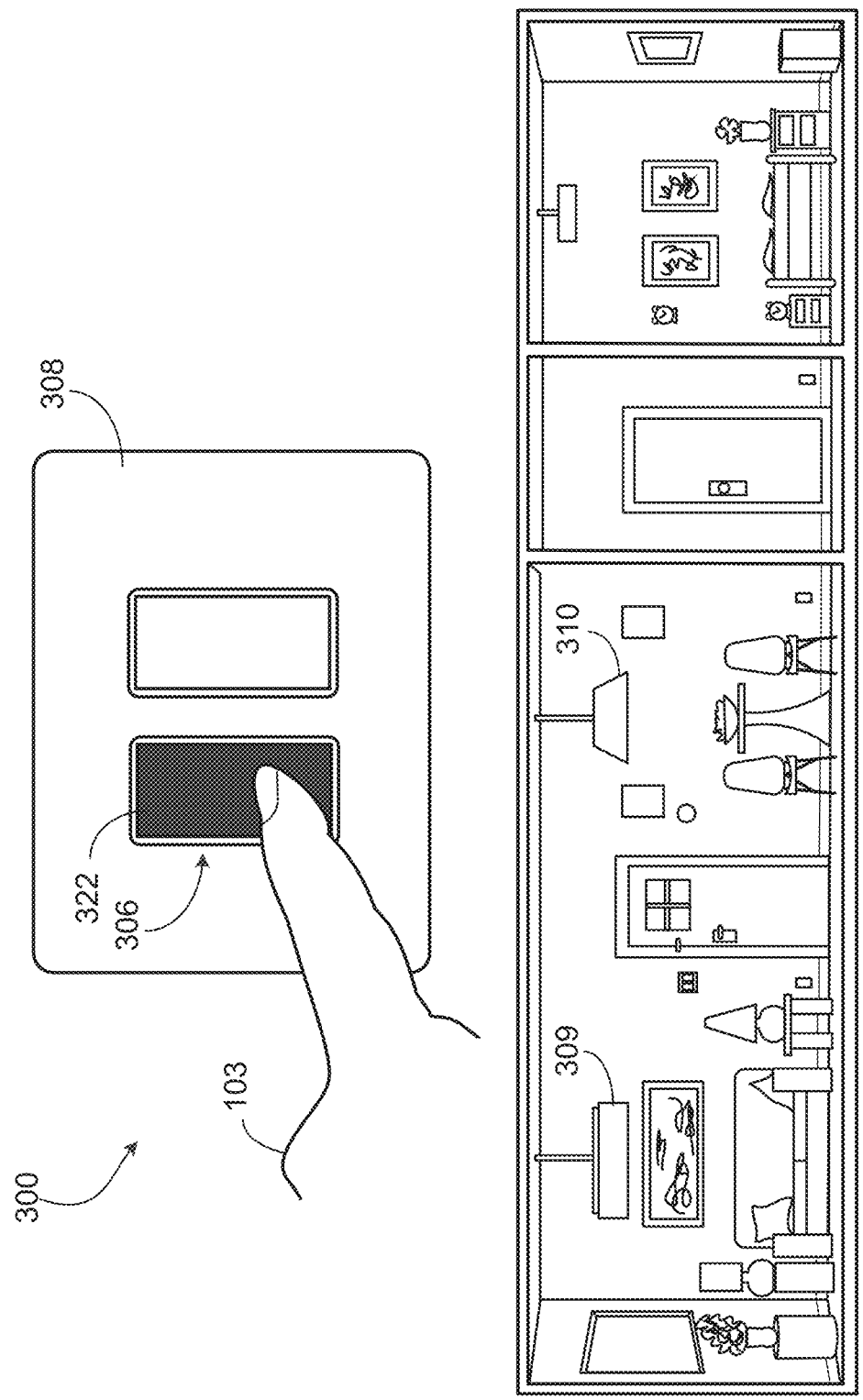
FIGS. 3A-3F illustrate a lighting control device transitioning through various lighting settings and a room having lighting fixtures controlled by the lighting control device.
Figure 3B:
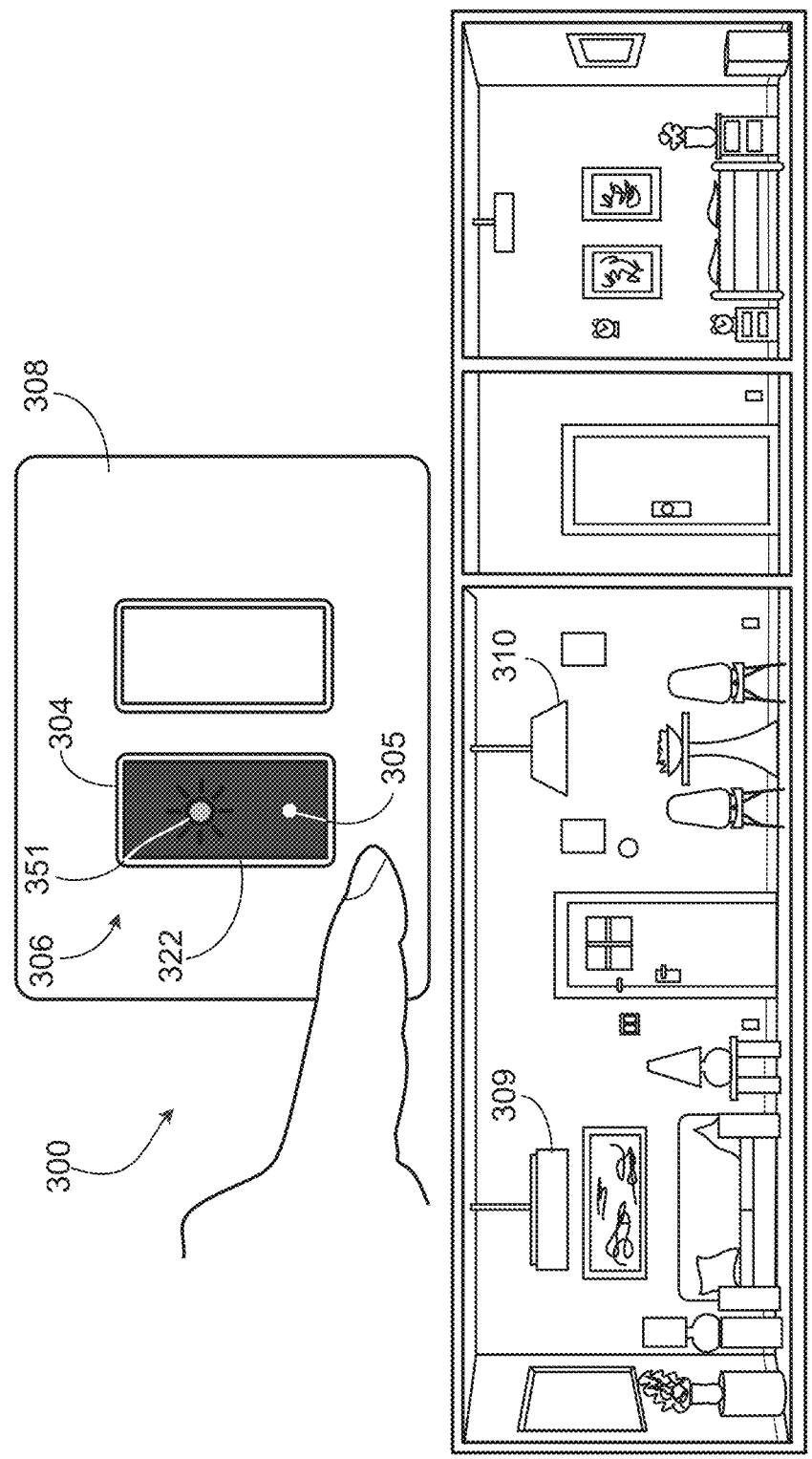
Figure 3C:
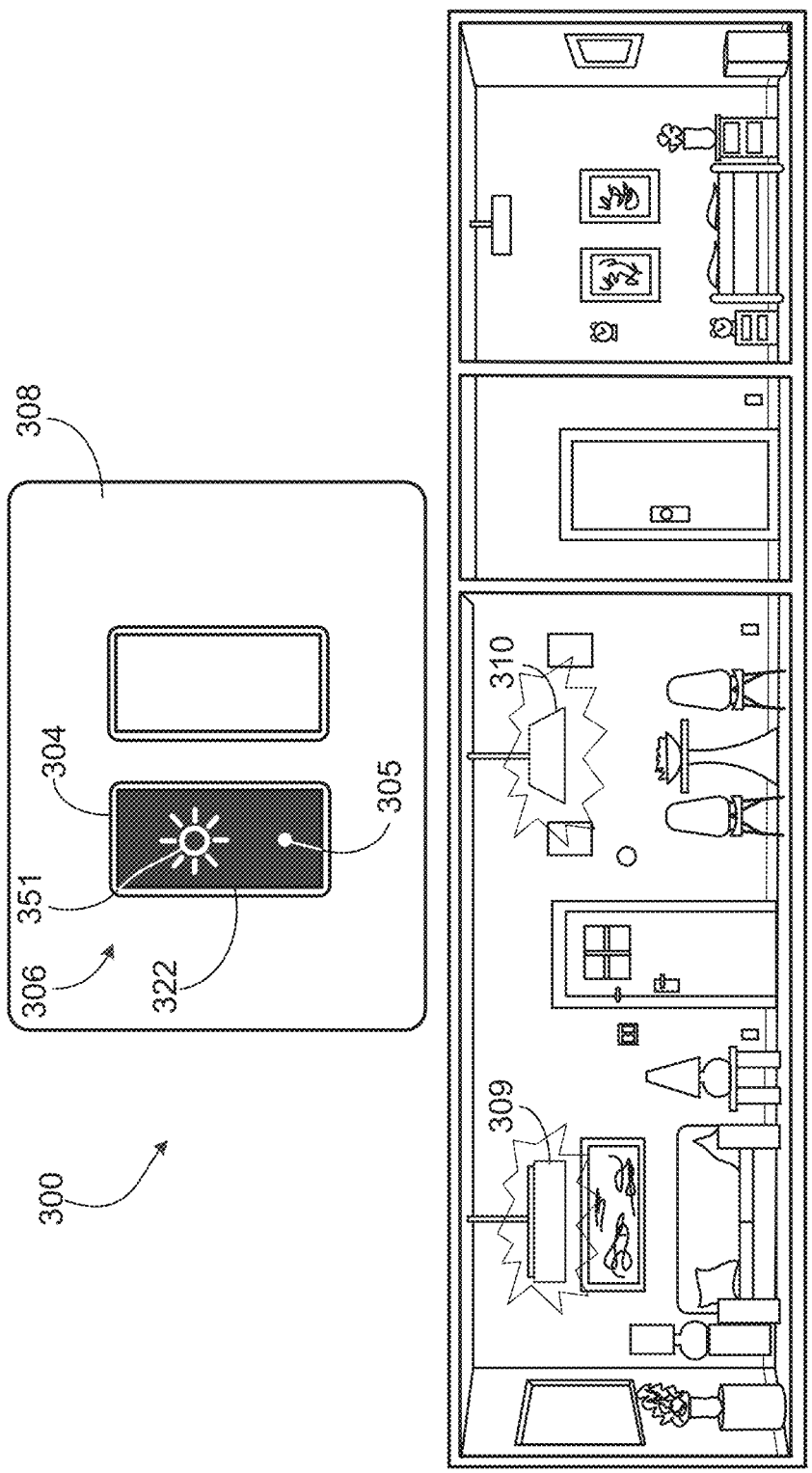
Figure 3D:
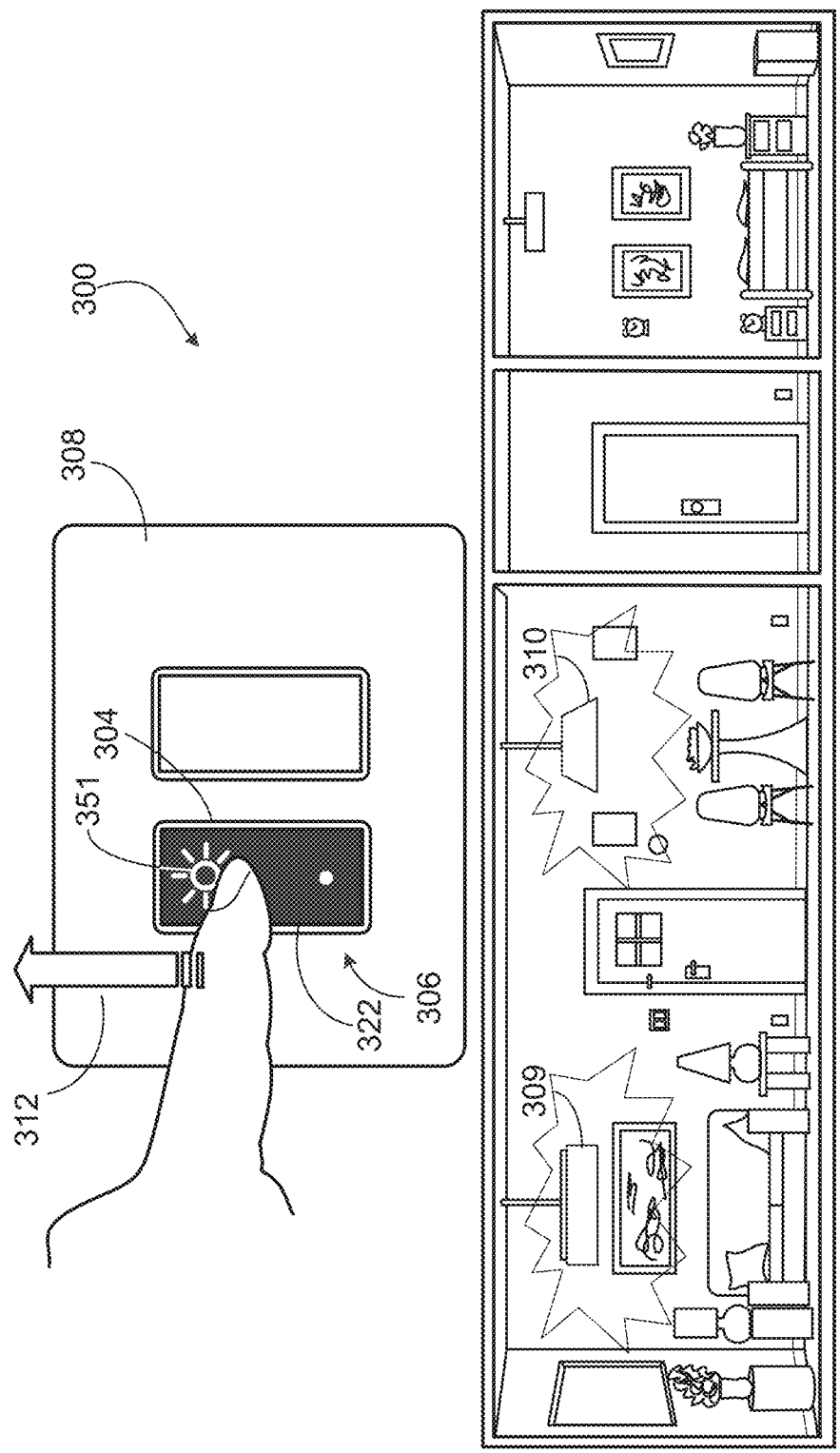
Figure 3E:
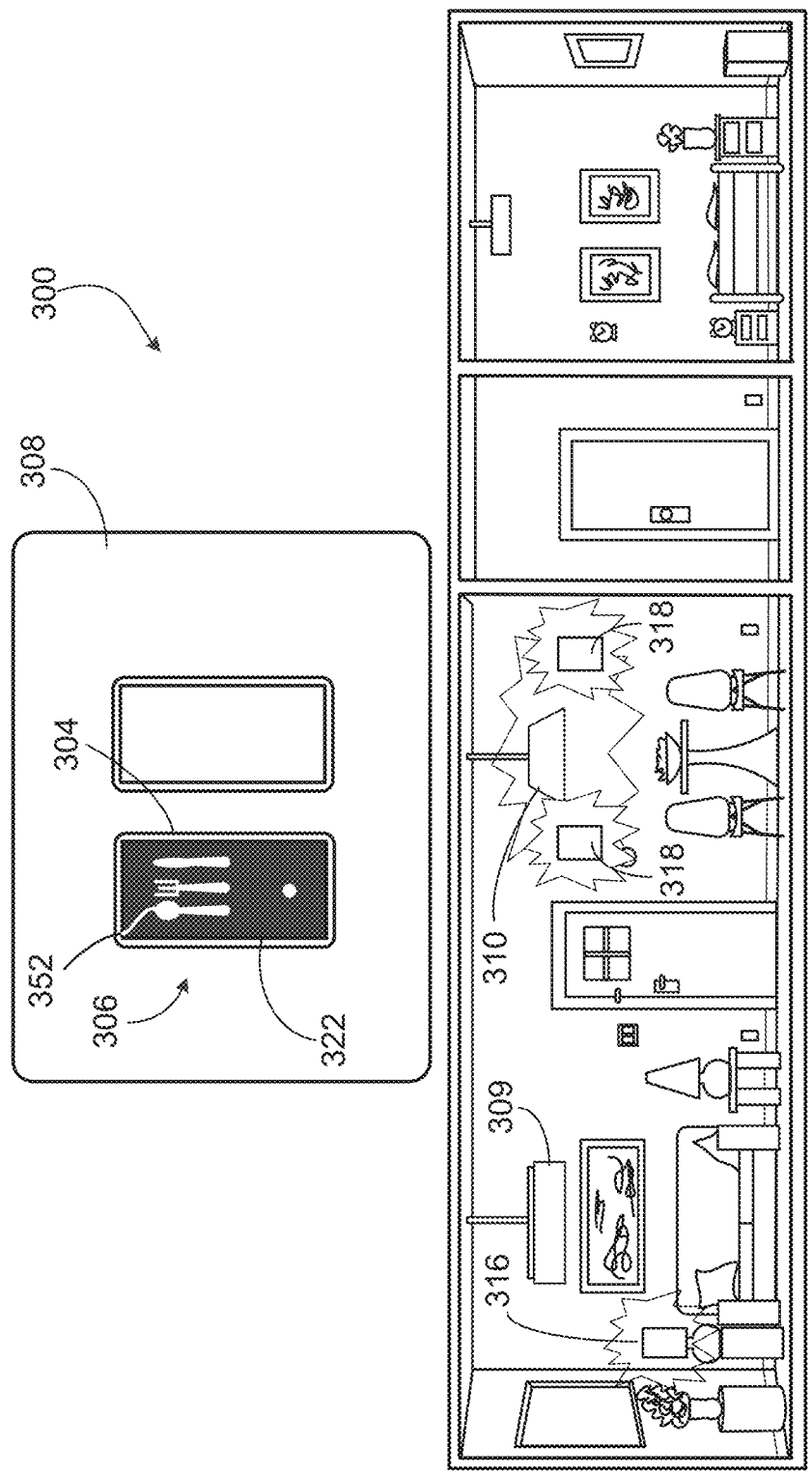
Figure 3F:
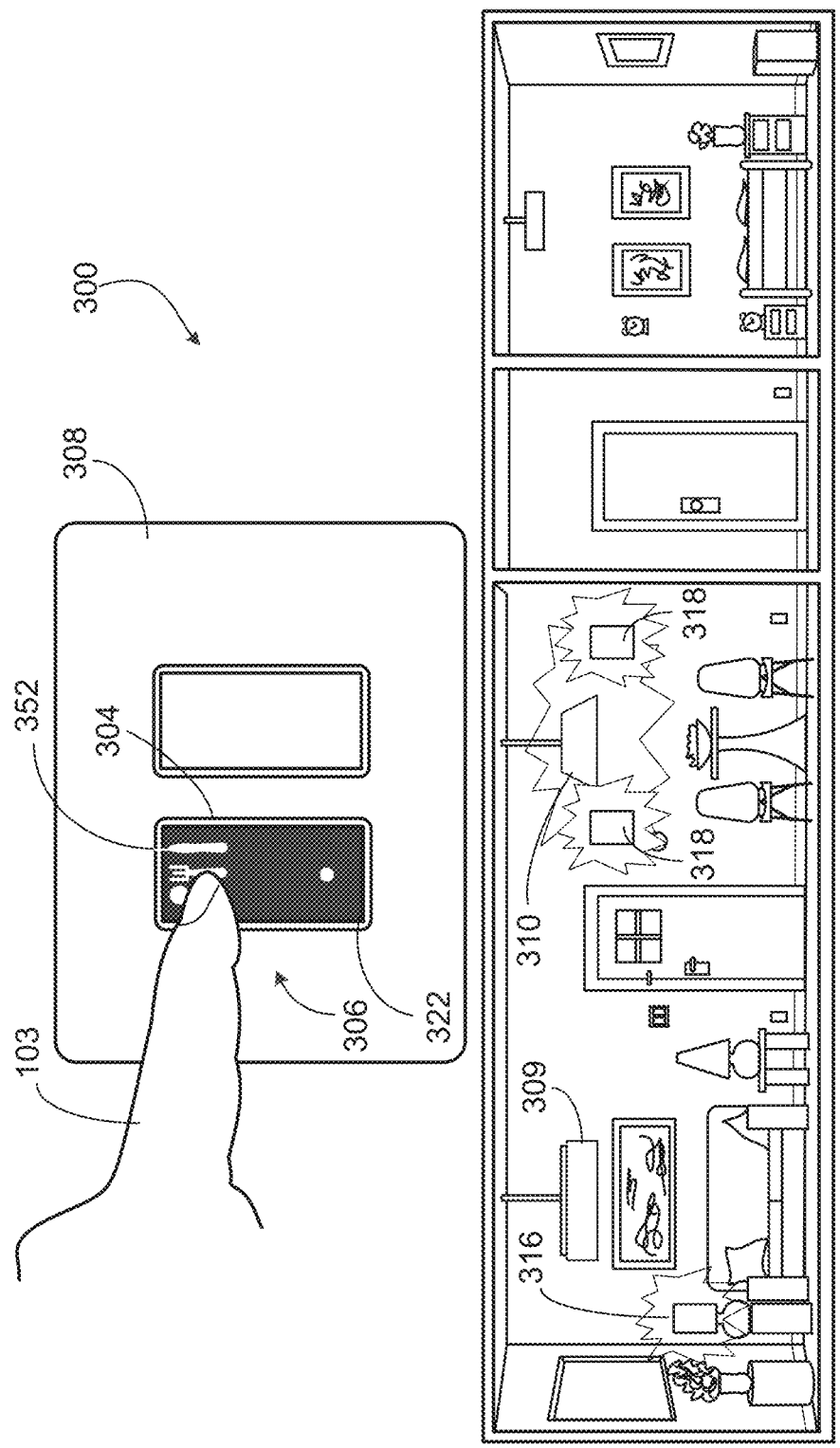

In FIG. 3A, the lighting control device 300 is connected to a base module positioned behind the wall plate 308. The lighting control device 300 includes a dynamic light switch actuator 306, operable in a manner similar to the light switch actuator discussed in connection with FIGS. 1A-2C, and an auxiliary light switch actuator. As demonstrated in FIG. 3A, the unilluminated outer actuation surface 322 of the light switch actuator 306 is inactive and not energized. In response to a user 103 moving the actuation surface 322 of the light switch actuator 306, the light switch actuator 306 begins to become energized, as shown in FIG. 3B. The energization or activation of the light switch actuator 306 is signaled by the power light indicator 305 and by full lighting setting icon 351. As shown in FIG. 3C where the icon 351 is fully lit (rather than partially lit as in FIG. 3B), the light switch actuator 306 is fully energized. In this particular configuration, the primary lights 309 and 310 are illuminated at full power. FIG. 3D shows the transition between lighting settings. As demonstrated in FIG. 3D, this transition is facilitated via user 103 completing swiping gesture 312 across the tactile display 304 and along the actuation surface 322. As the user completes the gesture 312, the icon 351 is swiped from the tactile display 304 as the tactile display toggles to a new light setting shown in FIG. 3E. The new light setting shown in FIG. 3E is represented or identified by the dinner icon 352. The new light setting shown in FIG. 3 has the light fixture 309 powered down and has caused lamp 316 and sconces 318 to become illuminated to change the lighting scene in the room. The change in the light setting causes a change in distribution of power to certain lighting fixture based on the selected lighting setting. The light switch actuator 306 may be pre-programmed with a plurality of lighting settings or may be configured with particular lighting settings as specified by the user 103. A further swiping gesture 315 shown in FIG. 3F or a different gesture are used to transition from the lighting setting of FIG. 3F represented by icon 352 to a further lighting setting.

Figure 4:
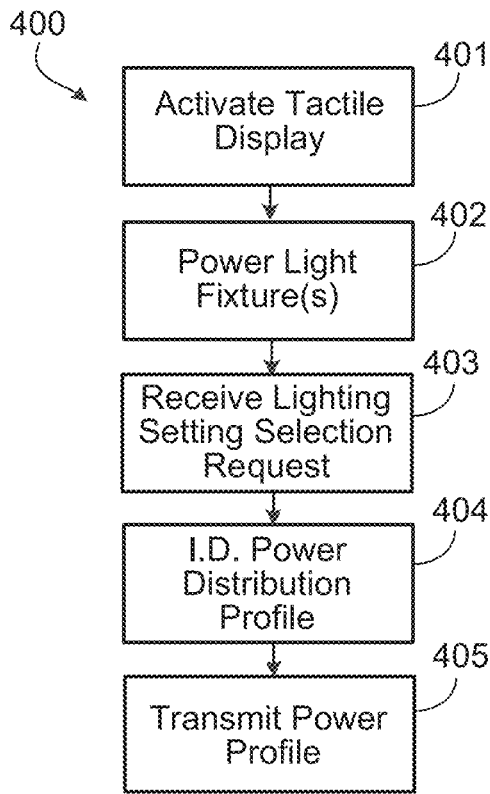
FIG. 4 provides a flow diagram of operations of a system for controlling a lighting control device.

FIG. 4 provides a flow diagram of operations of a system for controlling a lighting control device and, more particularly, control operations of a control system, such as processor 130 configured to control the lighting control device 100 or 300, in accordance with various embodiments of the present invention. At 401, the tactile display housed in the light switch actuator is activated by moving the light switch actuator, for example by moving the actuation surface of the light switch actuator. At 402, the light fixtures electrically coupled to the light switch actuator via a base module are powered as the movement of the light switch actuator causes a contact component to move into a new position and thereby permit or cause an electrical flow path between a power source and the light fixture(s) to be closed. The tactile display housed in the light switch actuator is moved contemporaneously with the actuation surface. At 403, a lighting setting selection request is received via the tactile display, for example by a particular motion or motions on the tactile display. The lighting setting selection request identifies a lighting setting from among a plurality of lighting settings. A user may swipe multiple times to toggle through the plurality of lighting settings or may conduct a specific motion that corresponds to a particular lighting setting including, but not limited to, a half swipe and tap to achieve a light intensity of all the connected light fixtures at half of their peak output. The lighting settings identify distinct power distribution schemes for one or more light fixtures connected to the light switch module. At 404, a power distribution scheme is identified. At 405, the identified power distribution scheme is transmitted, for example by the base module responding to control signals from the light switch actuator, to adjust one, some, or all of the lights based on the power distribution scheme corresponding to the lighting setting selected. The power distribution schemes or profiles may be stored in a memory device of the lighting control device. In certain embodiments, the power distribution schemes may be adjusted to account for other parameters such as ambient lighting from natural light or an unconnected source. In certain embodiments the power distribution schemes may be adjusted based on one or more other sensor parameters. In particular embodiments, the lighting setting may be adjusted by automation based on time of day, sensed parameters such as light, temperature, noise, or activation of other devices including, but not limited to, any electronic device described herein.

Figure 5:
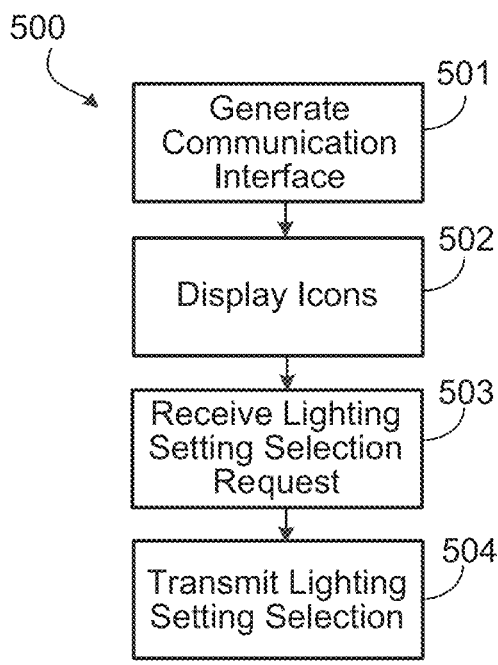
FIG. 5 shows a flow diagram of a system for remotely operating a lighting control device.

FIG. 5 shows a flow diagram of a system for remotely operating a lighting control device. In one or more embodiments, the lighting control device 100 or 300 may be operable from a remote device if the actuator switch is activated or energized. In such instances, the remote device may include one or more computer program applications, such as system 500, operating on the device to communicate with and control the lighting control device. Accordingly, at 501, the control system 500 initiates a connection module to generate a communication interface between a mobile electronic device and a light switch module. The connection module may cause the remote device to send one or more wireless transmissions to the lighting control device via a communication protocol. At 502, the control system 500 causes the remote device to generate a display of icons on a display device of the mobile electronic device to facilitate selection of a lighting setting. At 503, the control system 500 receives a lighting setting selection based on the user selecting a particular icon. At 504, a transmission module causes the lighting setting selected to be transmitted to the lighting control device so that the light switch module and/or the base module can cause the power distribution scheme corresponding to the lighting setting to be transmitted to the lighting fixtures. The tactile display of the lighting control device may be updated in concert with receipt of the lighting setting to display the icon selected on the mobile electronic device and corresponding to the lighting setting selected on the tactile device.

Figure 6:
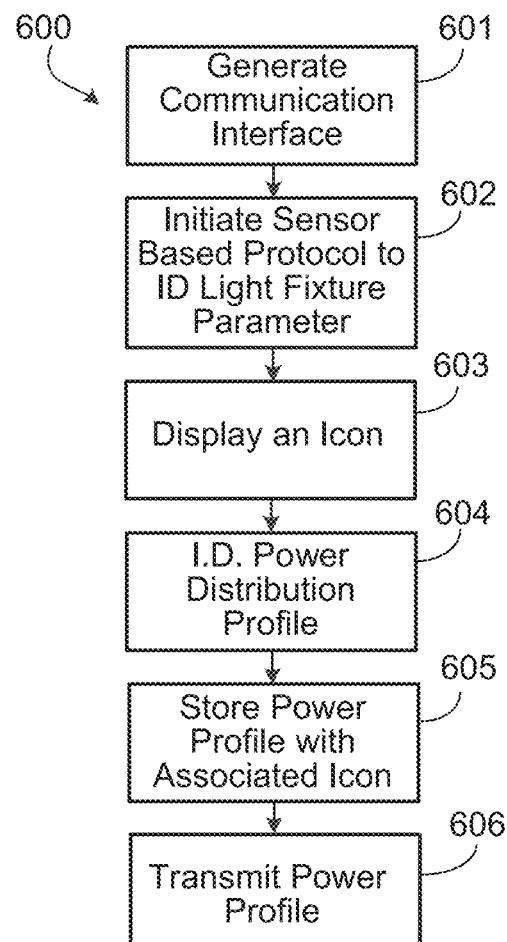
FIG. 6 illustrates a flow diagram of a system for remotely configuring operations of a lighting control device.

FIG. 6 illustrates a flow diagram of a system for remotely configuring operations of a lighting control device. The remote device may include devices including, but not limited to a mobile phone, a mobile computing device or a computing device remote from the light control device. At 601, the mobile electronic device generates a communication interface with the light switch module. At 602, a light fixture identification module initiates a sensor-based protocol to identify a parameter associated with one or more light fixtures connected to the light switch control module. At 603, a display selection module causes a display of an icon to appear on a display device of the mobile electronic device. At 604, a lighting setting configuration module allows a user to create a power distribution scheme or profile for the light fixtures identified based on the identified parameters and a user specified input related to light intensity. At 604, a storage module is used to the store the power distribution scheme and associate a particular lighting setting icon with the power distribution scheme. At 605, a transmission module transmits the power distribution scheme and the associated icon to the light switch control module.

Figure 7A:
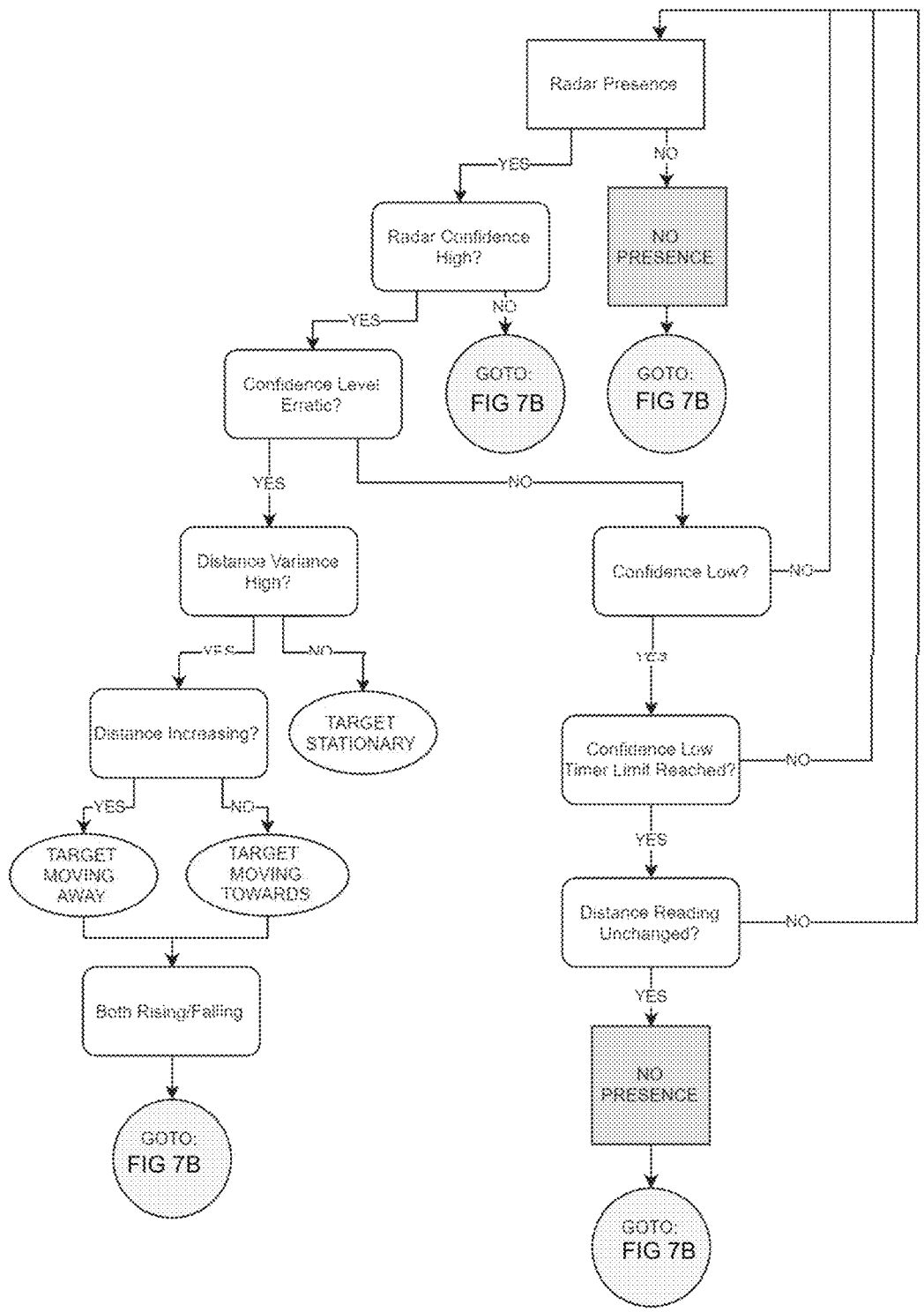
FIG. 7A-7B are flow diagrams illustrating an embodiment of sensor fusion for analysis of sensor signals obtained from a primary sensor and an auxiliary sensor of a sensor system communicably coupled to a controller system.
Figure 7B:
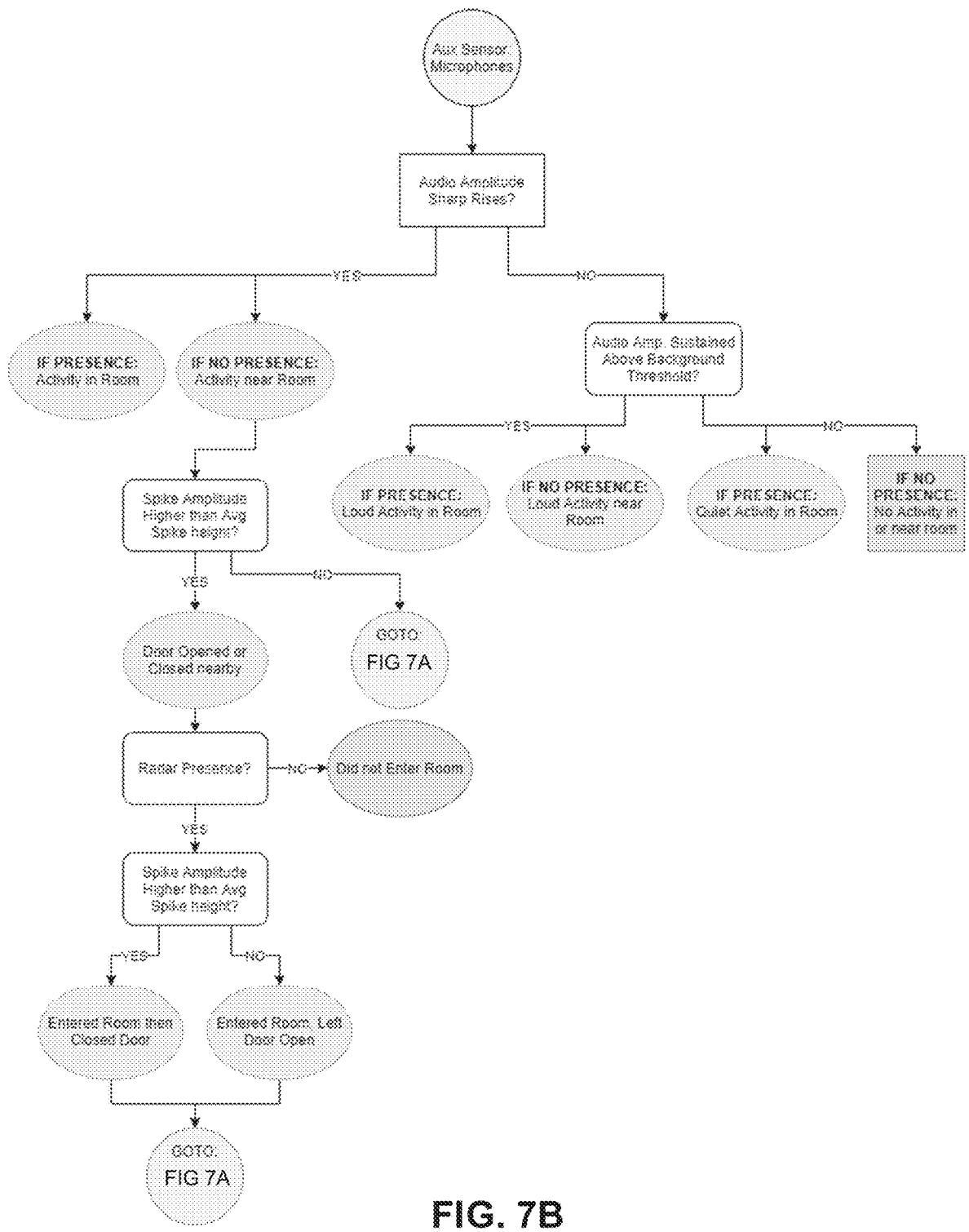

FIG. 7A-7B are flow diagrams illustrating an embodiment of sensor fusion for analysis of sensor signals obtained from a primary sensor and an auxiliary sensor of a sensor system communicably coupled to a controller system. For example, FIG. 7A illustrates analysis of auxiliary sensor signals obtained from an auxiliary sensor of a sensor system communicably coupled to a controller system. A lighting control system includes the sensor system positioned in a lighting control module. The sensor system includes a primary sensor and at least one auxiliary sensor. The sensor system includes a plurality of sensor types, which includes "active" sensors (i.e., sensors that transmit some type of energy and detect a change in the received energy created by the presence or motion of a subject) and "passive" sensors (i.e., sensors that detect some type of energy or matter that is emitted by the subject or detect a change of some natural emission or emitted field of energy caused by the subject). The controller system of the lighting control system is communicably coupled to the sensor system and configured to control a transmission of the quantity of electrical energy to a lighting circuit of a luminaire electrically connected to the lighting control module. The primary sensor in the sensor system is configured to monitor continuously. The controller system is configured to analyze one or more primary sensor signals from the primary sensor. The controller system is configured to selectively analyze one or more auxiliary sensor signals obtained from the auxiliary sensor in response to the primary sensor signals from the primary sensor being below a predetermined threshold (i.e., failing to detect presence of the subject). In this manner, signals from a multitude of different sensor types and sensitivities may be fused to more accurately detect presence of a subject. The controller system is further configured modify the transmission of the quantity of electrical energy to the lighting circuit in response to the analysis of one or more of the primary sensor signals and the auxiliary sensor signals.

In one or more embodiments, the controller system is configured to analyze data determined to represent activity forward of a switch housing for the lighting control system and to exclude data determined to represent activity rearward of (i.e., behind) the switch housing. The controller system is configured to determine presence of a subject based on analyzing sensor signals from the primary sensor and the auxiliary sensor. The controller is configured to control lighting of a luminaire in response to determining presence of a subject. The controller system is configured to selectively analyze an auxiliary sensor signal in response to uncertainty in the primary sensor signals from either (1) a lack of a high level of confidence in the primary sensor signal or (2) an erratic confidence level (e.g., sporadically occurring high levels of confidence) and a high variance in the primary sensor signals, for example detecting that the subject is both moving away from and towards the lighting control sensor system. That is, the auxiliary sensor may be used to correct uncertainty in determinations from the primary sensor. In an embodiment expiry of a duration for a low confidence level in the primary sensor signal may trigger a resample of the primary sensor signal. In this manner, signals from the primary and auxiliary sensors may be effectively fused to more accurately detect presence of and track a subject.

FIG. 7B illustrates detection and movement tracking of a subject in a room by the controller system based on analyzing sensor signals from the auxiliary sensor due to a lack of certainty or lack of detection of a subject in the primary sensor. In one or more embodiments, the controller system is configured to determine a number of subjects in a room based on analyzing sensor signals from the primary sensor and the auxiliary sensor in a fused manner so that detection of a subject by one type of sensor (e.g., the primary sensor) may be confirmed by another type of sensor (e.g., the auxiliary sensor). One or more auxiliary sensors (e.g., microphones) may be used to detect sound waves to determine presence of a subject. Illustratively, presence of a subject may be sufficiently determined (1) when an audio amplitude is sustained above a threshold, or (2) when a spike in audio amplitude (e.g., indicating opening/closing of a door) is coupled with primary sensor (e.g., radar) detection as a sensor fusion (i.e., combining different sensor signals in a model to reduce uncertainty in detection by any one sensor alone).

Figure 8:
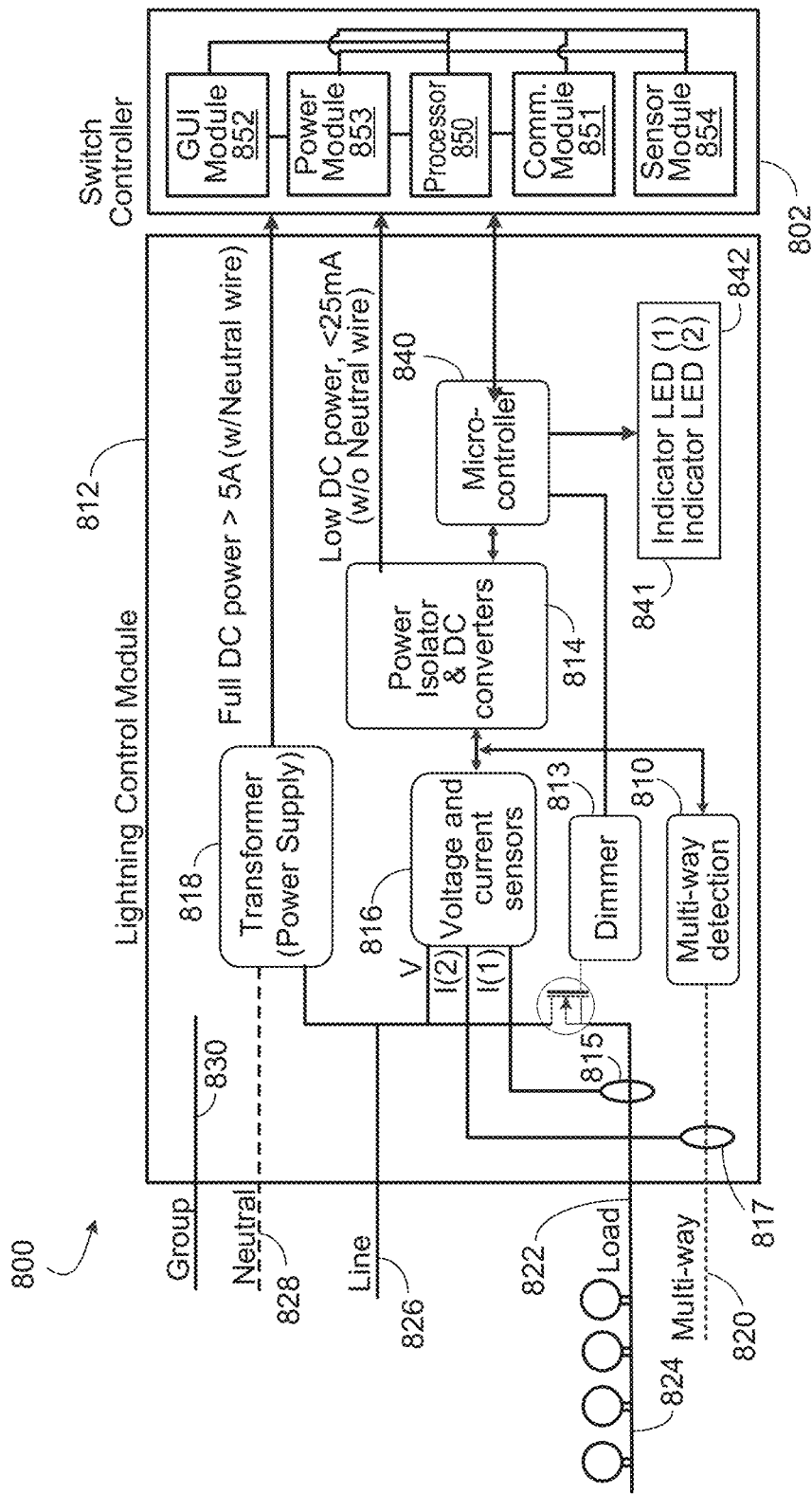
FIG. 8 is a diagram of a lighting control system.

FIG. 8 is a schematic of a lighting control system 800 configured to execute certain lighting control operations described herein. The lighting control system 800 illustrates lighting control system components that can be implemented with a lighting control system including an air gap system as described herein. The lighting control system 800 is depicted separated into a base lighting control module 812 (which may be configured in a manner similar to base module 112) and a switch module or switch controller 802 (which may be configured in a manner similar to switch module 102). As described herein, the switch module 802 can include a tactile interface, operable via the graphical user interface module 852, and a switch actuator, such as the tactile display 104 and the light switch actuator 106 described herein. The switch module 802 houses a processor 850, which may be configured to send commands to microcontroller 840 and receive inputs from the micro-controller 840 to control the operation of a transformer 818, a power isolator and an AC to DC converter 814 (which may include a flyback converter), and a dimmer 813 based on a MOSFET, a voltage and current sensor 816. In some embodiments, the base lighting control module 812 may include a TRIAC based dimmer. The power isolator 814 separates the analog AC current from the low power or DC digital components in the base lighting control module 812 and the switch module 802. The power isolator 814 may provide power inputs to the switch control module 802 via a power module 853. Power module 853 includes power circuitry configured to regulate the flow of power from the base module 812 to the switch controller module 802 including directing power to one or more of the modules in the switch controller module 802. The switch module 802 also houses a communication module, which can include one or more antennae or other wireless communication modules. The switch module 802 also houses a sensor module, which can include one or more sensors, such as a light sensor, a camera, a microphone, a thermometer, a humidity sensor, and an air quality sensor. The processor 850, is communicably coupled with one or more modules in the switch module 802 to control the operation of and receive inputs from those modules, for example to control modulation of the flow of electrical energy to a lighting circuit of a light fixture 824 connected to the base lighting control module 812.

The base lighting control module 812 includes a ground terminal 830 for grounding various electrical components container in the module 812. The base light control module 812 includes a neutral terminal 828 for connecting to a neutral wire, a line terminal 826, and a load terminal 822. As shown in FIG. 8, the voltage and current sensor(s) are coupled to the load line to detect changes in the voltage or current along the line carrying power to one or more light fixtures 824 connected to the lighting circuit (750). The base lighting control module 812 also includes a controller 840 communicably coupled to the processor 850. The base lighting control module 812 also includes LED indicator lights 842 and 841 for indicating information regarding the status of the base lighting control module 812. For example, in some embodiments LED indicator light 841 can indicate if a neutral wire is connected while LED indicator light 842 can indicate if a 3-way connection is connected.

FIG. 9A-9C illustrate various embodiments of a sensor system. As noted, the lighting control system, such as lighting control system 800, includes the sensor system positioned in a lighting control module, such as base lighting control module 812. The sensor system includes a primary sensor and at least one auxiliary sensor. The sensor system includes a plurality of sensor types. In one or more embodiments, the plurality of sensor types is selected from the group consisting of a radar sensor system, a time of flight (ToF) sensor system, an inertial measurement unit (IMU) sensor system, and a microphone (MIC) sensor system. The sensors are used in concert to determine sedentariness, sitting-vs-standing, footsteps, fall detection, commotion/play, speech and/or music. Notably, the primary and auxiliary sensors are of different types based on distinct classes of excitation (e.g., mechanical, electromagnetic and electro/opto-chemical) that may be used cooperatively without cross-interference. For example, the radar (active microwave frequency range excitation) is used in concert with the microphone (passive sonic frequency vibration excitation) or IMU (passive gyro-mechanical excitation) to determine if someone is present in the room, if they are stationary or moving, and if there is noisy or quiet activity. In other embodiments, the primary sensor is a radar sensor system and the auxiliary sensor is selected from a group consisting of a ToF sensor system (optical frequency range excitation), an IMU sensor system, a MIC sensor system and a thermal sensor, e.g., passive infrared (PIR) or thermal camera (thermal/infrared frequency excitation).

In one or more embodiments, the radar system is employed for detecting occupancy, range of subject, to take respiration measurements, for heartbeat detection, for determining direction of travel of subject and/or for determining speed of travel of a subject. The radar system may be a pulsed radar. The pulsed radar is implemented to distinguish between a moving object and a stationary object.

In one or more embodiments, the auxiliary sensor includes a 9-axis IMU sensor. The 9-axis IMU sensor can include a 3-axis accelerometer, a 3-axis gyroscope, and a 3-axis magnetometer. The 9-axis IMU sensor can be implemented to detect motion of the lighting control module relative to an initial installation position and orientation. The 9-axis IMU sensor can detect vibrations across multiple frequency ranges that are large enough in amplitude to cause very small movement in the lighting control module.

In one or more embodiments, the auxiliary sensor includes a microphone (MIC). The microphone can be implemented to detect ambient noise levels, to detect conversations, to detect music playing, to detect footsteps, to detect operation of appliances, and to determine the direction of a noise source relative to the lighting control module. Standard audio recordings detected by the microphone can be algorithmically analyzed to detect speech, music, or other patterns. Footsteps can be detected by analyzing raw audio power output and looking for rhythmic peaks similar to natural human gait. Multiple microphones and algorithms can be used to calculate where relative to the lighting control device a noise or set of noises came from, represented as a measured angle to the left of right of the switch.

In one or more embodiments, the IMU may be used in concert with one or more microphones. For example, the IMU can be used to measure level and frequency of mechanical vibrations in a room (e.g., conducted by the floor and walls) and the microphone(s) (e.g., sonic vibrations through air) may be used to measure large impact events such as walking, running, jumping, or audio events such as shouting or singing. The combined detections can measure the level of activity in the relevant room. For example, high levels of moderately rapid (mid-frequency) vibrations accompanied by loud, rhythmic audio peaks and elevated background noise level could mean 'dance party' or 'play time'

In one or more embodiments, the auxiliary sensor may include a gas sensor such as a $CO_2$ sensor. The $CO_2$ sensor can be used to estimate the number of people in room or home based on rise of $CO_2$ concentration from a measured baseline. For example, measuring rise rate of $CO_2$ concentration to estimate the number of people and/or level of activity (very quick rise in $CO_2$ concentration could mean many people entered at once, few people are now doing strenuous activity, or both)

Various embodiments also provide lighting control systems that include a light switch module and a radar system coupled to the light switch module. In one or more embodiments, the radar system may include a single-ended elliptical patch antenna. The lighting control system can employ a light switch wall-box and line power to support a radar-based occupancy and activity detection system and can be implemented in residential and commercial environments.

In one or more embodiments, the radar system includes one or more antenna(e), e.g., as shown in FIG. 9A-9C. The antennae for the radar system are positioned directly behind the front surface (i.e., the actuation surface and/or tactile display interface as shown in U.S. Pat. No. 9,839,099 incorporated by reference herein in its entirety) of the switch in certain embodiments. Positioning the radar antennae directly behind the front surface of the switch permits the antenna to be positioned outside of a wall box (described with reference to FIG. 1B).

FIG. 10A-10D illustrate various embodiments of a radar system. In one or more embodiments, the radar system includes the antennae and a radar chip. The antenna(e) and radar chip may be communicably coupled to one or more other processors. The radar system includes an antenna positioned inside the light switch module and in front of a wall box. The radar antenna may also be integrated into the wall plate to minimize radio frequency (RF) energy absorption and leverage the larger surface area for increased performance (e.g., range, tracking accuracy). The radar antennae integrated into the wall plate can be electrically connected to the light switch module, for example upon attaching the wall plate for powering the antennae or via a cable, such as a coaxial connection. The connection to the antennae integrated into the wall plate is facilitated via spring contacts that engage the switch module upon attachment of the wall plate or nesting of the switch module. The connection to the antennae integrated into the wall plate is facilitated via sliding contact(s) that engages as the switch module is inserted upon attachment of the wall plate or nesting of the switch module.

In one or more embodiments, the lighting control system includes a radar antenna integrated into a wall box. The radar antenna is positioned along one or more sidewalls of the wall box with controlled spacing and may be installed at construction or retrofittable with an "old-work" box. The radar antenna may be configured with isolated transmitting and receiving patches. The radar antenna may be configured in the switch module with isolated transmitting and receiving patches surrounding a display interface. The lighting control system may include a radar antenna in the switch module protruding from the wall box and a trim plate or wall plate so as to avoid radio occlusion from dense materials, such as steel.

In one or more embodiments, the lighting control system may be configured to detect contact with the switch module by reading a drastic (e.g., a step function) change in de-sensed/absorbed RF energy. The lighting control system may include a plurality of (e.g., two) Tx-Rx pairs (i.e., transmitter-receiver pairs) tuned for different rates of movement as illustrated in FIG. 10C. The Tx-Rx pair (located above the display) can be tuned for respiration measurements. The Tx-Rx pair (located below the display at/near the curved foot or kick) can be used to absorb RF when a user places his or her finger on the switch module to confirm presence and ready for biometric reading. The lighting control system may include multiple antenna transmitters and receivers within the switch module to read direction of movement and number of moving bodies. The lighting control system may further include multiple antenna transmitters and receivers within multiple switch modules within the same junction box to read direction of movement and number of moving bodies as illustrated in FIG. 10B. Switches having antenna transmitters and receivers may be placed several feet apart to provide coverage of an area from different positions and enable more accurate distance determination using triangulation as illustrated in FIG. 10D.

In one or more embodiments, the light switch module is a single body module. In other embodiments, the light switch module is an assembly of modules. For example, the assembly of modules can include a light switch module (e.g. as shown in FIGS. 3A-3G of U.S. Provisional Patent Application Ser. No. 62/880,404 incorporated herein) and a light switch base module configured for coupling to the light switch module (e.g., as shown in FIGS. 3H-3K and 4 of U.S. Provisional Patent Application Ser. No. 62/880,404, exploded view of the light switch module and base module). The light switch base module can include a base housing forming a well configured to receive at least a portion of the light switch module. The light switch module includes a light switch actuator, an actuator circuit board and a tactile display. The light switch module and the light switch base module can be electrically coupled to one another when the light switch module is nested within the base light switch module, for example as illustrated in FIG. 3A (see also U.S. Pat. No. 9,838,008, which is incorporated herein by reference in its entirety). The light switch actuator is configured to move a contact component from a first position to a second position to connect an electrical flow path by movement of an actuation surface of the light switch actuator. The tactile display is configured to move contemporaneously with the actuation surface and to toggle between lighting settings in response to one or more motions on the actuation surface. The tactile display is further configured to discretely display a distinct icon in response to a change in the lighting setting.

Figure 11:
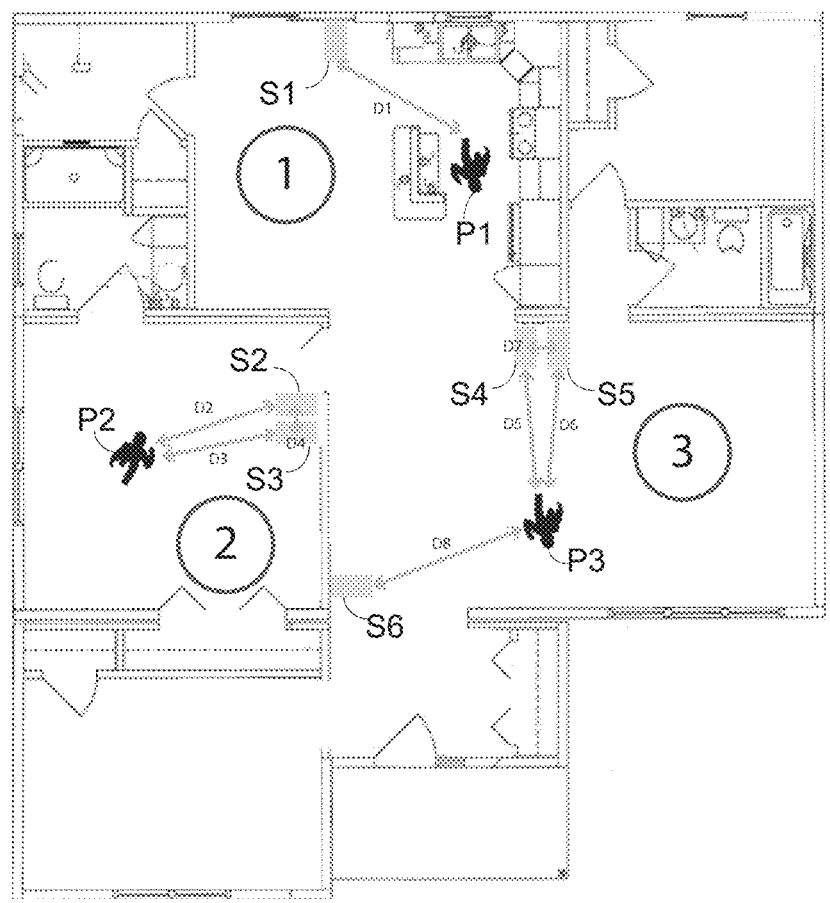
FIG. 11 illustrates an embodiment of a lighting control system that includes multiple antenna transmitters and receivers within one or more rooms.

FIG. 11 illustrates an embodiment of a lighting control system that includes multiple antenna transmitters and receivers within one or more rooms to read direction of movement and number of moving bodies. In one or more embodiments, the lighting control system is configured to utilize metal wall-plates, installation chassis, and or metal wall boxes to purposely occlude and tune radiation patterns of the radar antennae forward to read the area to which the switch is facing and ignore rear-facing activity. The lighting control system is further configured to use grounded planes (wall-plate, install chassis, wall box) to focus radiation pattern forward.

In one or more embodiments, the radar system of the lighting control system is configured for dynamic antenna performance depending on environment. For example, the antennae can be connected to metal elements, as they are available. External metal elements can be implemented to boost or focus antenna (even 3rd party or peripheral components). The radar system is configured to electrically detect a mechanical connection to a grounding plane. Ground-plane detection (understand general form and thickness of ground plane for radar/antenna system) may be implemented to characterize and integrate the antennae accordingly. A user or installer may manually enter grounding plane forms so that the radar/antenna system may characterize and integrate accordingly. Embodiments may use computer vision to identify grounding plane form so that the radar/antenna system may characterize and integrate accordingly.

Various embodiments provide methods of operating a lighting control system. In one or more embodiments, the lighting control system is used for sensing a person using one or more switches as demonstrated in FIG. 11 and as follows:

Single and Multi-Switch Sensing of Single Person

Scenario 1: Single sensing switch S1 in a room of, e.g., a home, office or other structure. The distance from a sensing switch S1 to a single person P1 is tracked and known. The tracked person P1 lies on a circle of radius D1 somewhere in the Field of View (FoV) of the switch S1.

D1—Distance range to the person P.

Scenario 2: Multiple switches in same gang-box. A two-dimensional (e.g., X-Y) position of a person P2 relative to sensing switches is known, with more switches in the same gang-box increasing confidence and with a minimum of three (3) switches for high confidence triangulation. The distance range to the person P2 is calculated from each sensing switch, and the distance between the switches is a known, e.g., a fixed quantity based on standard gang-box dimensions. From these values, the X-Y position can be calculated:

D2—Distance range from switch S2 to the person P2;
D3—Distance range from switch S3 to the person P2;
D4—Constant known distance between the switch S2 and the switch S3.

Scenario 3: Multiple switches in multiple gang-boxes. This arrangement allows the same capability as Scenario 2, but with the added benefit of estimating position and orientation of other sensing switches in other gang-boxes:

D5—Distance range from switch S4 to a person P3;
D6—Distance range from switch S5 to the person P3

D7—Constant known distance between the switch S4 and the switch S5;
D8—Distance range from switch S6 to the person P3.

In one or more embodiments, the lighting control system includes a side-facing radar antenna flanking the display pickup movement of occupants passing by the side of a switch as a trip wire. For example, when the switch is located next to a door, the radar antenna can detect that the door is opened and/or when someone is going in and out of a doorway. The lighting control system may employ a confidence interval to confirm occupancy utilizing low-level radar technology (noisy/unreliable) distributed across every switch in a home.

Various embodiments provide methods of operating a lighting control system. In one or more embodiments, the lighting control system is used for characterizing/training the radar within each room to understand basic activities, in addition to human/pet movement. Those activities can include a door opening, a window opening, an oscillating fan running, a robotic vacuum or cleaner cleaning, and static walls or stationary objects consistently reflecting a pattern. The radar system may provide sensor data (e.g., as shown in FIGS. 6A and 6B of U.S. Provisional Patent Application Ser. No. 62/880,404) for characterization by the radar system.

Various embodiments provide lighting control systems that include a light switch module and a radar system coupled to the light switch module.

In one or more embodiments, the radar and a display are positioned on the switch module (e.g. the radar is integrated into the display, as illustrated in U.S. Pat. No. 9,839,099). The radar may be implemented with a radar antenna in the switch with isolated transmitting and receiving patches. The display (as shown by way of example in Appendix A of U.S. Provisional Patent Application Ser. No. 62/880,404) is a dynamic display operable in different modes. For example, the dynamic display permits the radar to be only active when the display's switching components are off. Illustratively, the display is configured to operate within a frequency band sufficiently distant from that of the radar to prevent interference. The display may include RF blocking material sandwiched about the display to prevent the display components from saturating radiation between transmitter and receiver.

In one or more embodiments, the display may be retracted in the switch module to minimize RF energy absorption. In another embodiment, the display may be a rear-positioned display to minimize RF energy absorption. The display may be a rear-positioned display with oil between the display and glass acting as a lens to make the display appear closer to front glass. Low conductive mass display technologies (such as e-ink, LED matrix, TN-LCD) may be employed near the radar antenna to minimize RF energy absorption.

In one or more embodiments, the switch includes pairs of transmitter-receiver patches isolated above and/or below the display to minimize RF energy absorption. The Tx-Rx pair on plane are angled away from the display to minimize RF energy absorption. The Tx-Rx pair on plane may be angled away from the display in "kick" to minimize RF energy absorption.

Various embodiments provide a lighting control system apparatus for automated lighting adjustment, the apparatus including a lighting control system configured to operate according to one or more of the preceding embodiments. The lighting control system can include one or more features shown and described in the embodiments illustrated in Appendix A of U.S. Provisional Patent Application Ser. No. 62/880,404.

Various embodiments provide a lighting control system apparatus including one or more sensors as previously described and one or more other sensors include, for example a combination of one or more of a radar, a time of flight (ToF) sensor, an inertial measurement unit (IMU) sensor, a microphone (MIC), and a temperature/humidity (TEMP/HUMID) sensor, as shown in the sensor fusion of FIG. 9A-9B.

In one or more embodiments, the sensor fusion is provided in the light switch system for the purpose of (in addition to occupancy) tracking movement as well as a number of human adults, human children, and/or pets. The sensor fusion may complement and fill in for blind spots and sensory anticipation, e.g., sensing IMU and microphones. The sensors may be employed for sensing occupancy, e.g., presence, number of people, location in space, anticipation, true vacancy, range finding (ToF and radar may complement each other for short and long range respectively). The sensors may be employed for sensing activities, e.g., sedentariness, sitting-vs-standing, footsteps, fall detection, and/or commotion/play. The sensors may be employed for sensing health, e.g., respiration, heart rate (HR), sleep, mobility, routines, and gait.

In one or more embodiments, a microphone (MIC) and a time of flight (ToF) sensor may be employed. An angle of arrival can be determined with dual microphone sensors and the ToF sensor can be used as a precision trip wire used to train determining measurements from the dual microphones.

In one or more embodiments, the sensor fusion may include a $CO_2$ sensor and occupancy sensor(s) to estimate the number of people in a room. The rate of $CO_2$ rise can be used to estimate the number of people and/or level of activity.

In one or more embodiments, the radar may be used to detect, e.g., occupancy, ranging, respiration measurement, heartbeat detection, direction and speed of travel. The antenna's configuration focuses the field-of-view (FoV) forward of switch (ignore activity behind walls). The IMU may be employed to detect footsteps, fall detection, and commotion/play. The microphone (MIC) sensor can be used to detect ambient noise levels, conversation detection, music detection, footstep, and appliance activity. The radar may also be used for enhanced precision of occupancy and vacancy, and detection. The information obtained thereby can used for controlling conditioned air and/or energy conservation via lighting and HVAC controls. The energy conservation can be employed for setting predictive path lighting (as described in PCT application, WO2018009785, incorporated by reference herein in its entirety).

In one or more embodiments, the information obtained by the radar sensing systems described herein can be used for scene prediction influenced by types of crowd approaching (individual, couple, parent and child, person and pet, and larger crowd. The information obtained by the radar sensing systems described herein may be employed for safety and security, e.g., using a switch with radar for accurate security locating device, and dynamic pattern recognition to label signatures of entry points (doors and windows). The information obtained by the radar sensing systems described herein may be employed for health monitoring, e.g., for monitoring movements, patterns and activities to assess sleep quality. The information obtained by the radar sensing systems described herein may be employed for data gathering and confidence assessments, e.g., for affirmation of activity assumptions, reinforced event signature from multiple static data gathering sources (switches), leveraging infrastructure stability for controlled (e.g., laboratory) settings (switches, doors, and windows that do not move), and understanding social openness by knowing how often doors are open or closed.

It should be appreciated that all combinations of the foregoing concepts and additional concepts discussed in greater detail below (provided such concepts are not mutually inconsistent) and in Appendix A are contemplated as being part of the inventive subject matter disclosed herein. In particular, all combinations of subject matter of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Embodiments of the subject matter and the operations described in this specification can be implemented by digital electronic circuitry, or via computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various, different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a user computer having a graphical display or a Web browser through which a user can interact with an embodiment of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific embodiment details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A lighting control system comprising:
   a lighting control module configured to cause a transmission of a quantity of electrical energy to a lighting circuit of a luminaire electrically connected to the lighting control module;
   a sensor system positioned in the lighting control module, the sensor system including a primary sensor and at least one auxiliary sensor, the sensor system further including a plurality of sensor types; and
   a controller system communicably coupled to the sensor system and configured to control the transmission of the quantity of electrical energy to the lighting circuit, wherein the primary sensor in the sensor system is configured to remain active continuously, wherein the controller system is configured to analyze one or more primary sensor signals from the primary sensor, wherein the controller system is configured to selectively analyze one or more auxiliary sensor signals obtained from the at least one auxiliary sensor in response to the one or more primary sensor signals being below a predetermined threshold that depends on a distance of a detected object being determined to be above a distance threshold based on the one or more primary sensor signals, the controller system is further configured to modify the transmission of the quantity of electrical energy to the lighting circuit in response to the analysis of the one or more primary sensor signals and the one or more auxiliary sensor signals.

2. The lighting control system according to claim 1, wherein the controller system is configured to select a lighting scene from a plurality of lighting scenes based on analyzing the sensor signals from the primary sensor and the at least one auxiliary sensor.

3. The lighting control system according to claim 1, wherein the controller system is configured to modify a lighting setting of a light switch module based on analyzing the sensor signals from the primary sensor and the at least one auxiliary sensor.

4. The lighting control system according to claim 1, wherein the predetermined threshold depends on a variability in a plurality of primary sensor signals of the primary sensor being above a predetermined variability range.

5. The lighting control system according to claim 1, wherein the at least one auxiliary sensor is configured for activation in response to a detection by the primary sensor.

6. The lighting control system according to claim 1, wherein the at least one auxiliary sensor is configured to remain inactive until selectively activated by the controller system.

7. The lighting control system according to claim 1, wherein the plurality of sensor types is selected from a group consisting of a radar sensor system, a time of flight sensor system, an inertial measurement unit sensor system, and a microphone sensor system.

8. The lighting control system according to claim 1, wherein the primary sensor is a radar system and wherein the at least one auxiliary sensor is selected from a group consisting of a time of flight sensor system, an inertial measurement unit sensor system, and a microphone sensor system.

9. The lighting control system according to claim 8, wherein the radar system is a pulsed radar.

10. The lighting control system according to claim 8, wherein the at least one auxiliary sensor comprises a 9-axis inertial measurement unit sensor.

11. The lighting control system according to claim 10, wherein the 9-axis inertial measurement unit sensor comprises a 3 axis accelerometer, a 3 axis gyroscope, and a 3 axis magnetometer.

12. The lighting control system according to claim 8, the at least on auxiliary sensor comprises a microphone.

13. The lighting control system according to claim 1, where the lighting control module comprises a light switch actuator.

14. The lighting control system according to claim 1, the lighting control module comprises a light switch actuator including a contact component and a tactile display housed in the light switch actuator.

15. The lighting control system according to claim 14, wherein the light switch actuator is configured to move the contact component from a first position to a second position to connect an electrical flow path by movement of an actuation surface of the light switch actuator and wherein the tactile display is configured to move contemporaneously with the actuation surface, the tactile display configured to toggle between lighting settings in response to one or more motions on the actuation surface, the tactile display configured to discretely display a distinct icon in response to a change in the lighting setting.

16. The lighting control system according to claim 1, wherein the controller system is configured to analyze data determined to represent activity forward of a switch housing for the lighting control system and to exclude data determined to represent activity rearward of the switch housing.

17. The lighting control system according to claim 1, wherein the controller system is configured to determine presence of a subject based on analyzing the sensor signals from the primary sensor and the at least one auxiliary sensor.

18. The lighting control system according to claim 1, wherein the controller system is configured to selectively analyze an auxiliary sensor signal response to determine from the one or more primary sensor signals that the object is moving away from and towards the lighting control system.

19. The lighting control system according to claim 1, wherein the controller system is configured to determine a number of subjects in a room based on analyzing the sensor signals from the primary sensor and the at least one auxiliary sensor.

20. The lighting control system according to claim 1, wherein the controller system is configured to track movement of a subject in a room based on analyzing the sensor signals from the primary sensor and the at least one auxiliary sensor.

* * * * *